US012164569B2

United States Patent
Schilders

(10) Patent No.: US 12,164,569 B2
(45) Date of Patent: Dec. 10, 2024

(54) SYSTEMS AND METHODS FOR TEMPLATING OF EXECUTABLE GRAPH-BASED MODELS

(71) Applicant: INFOSYS LIMITED, Bangalore (IN)

(72) Inventor: Steven Schilders, Columbus, IN (US)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 18/229,607

(22) Filed: Aug. 2, 2023

(65) Prior Publication Data
US 2024/0256607 A1    Aug. 1, 2024

Related U.S. Application Data

(60) Provisional application No. 63/448,738, filed on Feb. 28, 2023, provisional application No. 63/442,682, filed on Feb. 1, 2023.

(51) Int. Cl.
*G06F 16/90* (2019.01)
*G06F 16/901* (2019.01)

(52) U.S. Cl.
CPC .............................. *G06F 16/9024* (2019.01)

(58) Field of Classification Search
CPC ......... G06F 16/9024; G06F 16/22; G06F 8/35
See application file for complete search history.

(56) References Cited

U.S. PATENT DOCUMENTS

| | | | |
|---|---|---|---|
| 2018/0302275 A1* | 10/2018 | Fawcett | H04L 41/0803 |
| 2022/0036087 A1* | 2/2022 | López Felip | G06T 7/70 |
| 2022/0043973 A1* | 2/2022 | Arroyo | G06F 40/237 |

* cited by examiner

*Primary Examiner* — Apu M Mofiz
*Assistant Examiner* — Cindy Nguyen
(74) *Attorney, Agent, or Firm* — Finnegan, Henderson, Farabow, Garrett & Dunner LLP

(57) ABSTRACT

A method discloses obtaining a node template comprising a predetermined node structure and rules governing generation of node instances based on the node template. Data elements are received. A run-time node is generated in response to the reception of the data elements. The run-time node comprises the node template and a node instance. The node instance comprises the data elements mapped to the node template based on the rules of the node template. A run-time overlay comprising an overlay template and an overlay instance comprising processing logic implementing at least one generic rule of the overlay template are obtained. The executable run-time node is generated. It comprises a composition of the run-time node and the run-time overlay such that the processing logic of the run-time overlay is operable to interact with the run time node during execution of the executable run-time node.

18 Claims, 21 Drawing Sheets

SYSTEMS AND METHODS FOR TEMPLATING OF EXECUTABLE GRAPH-BASED MODELS

RELATED APPLICATIONS

The present application claims priority to U.S. Provisional Application No. 63/448,738, filed Feb. 28, 2023, and U.S. Provisional Application No. 63/442,682, filed Feb. 1, 2023, which are incorporated herein by reference in their entirety.

TECHNICAL FIELD

The present disclosure relates to executable graph-based models. Particularly, but not exclusively, the present disclosure relates to executable graph-based models which integrate data and data processing functionality. Particularly, but not exclusively, the present disclosure relates to template driven generation of executable graph-based models at run-time.

BACKGROUND

Modem system designs typically separate data storage from any functional data structure used from a processing logic perspective. This separation often occurs when data is "at rest" or at run-time where the processing system interacts with a copy of the relevant data in the processing space that can be of a different representation. This separation also leads to an impedance mismatch which requires some form of a data management solution to perform the necessary mappings between the two states. As a result of this separate of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which can access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 can severely inhibit the flexibility, extensibility, and responsiveness of any system created.

Therefore, there is a need for enhanced architectures which provide improved flexibility, extensibility, and responsiveness thereby providing more efficient data processing systems.

SUMMARY

According to an aspect of the present disclosure, there is provided a method for template-driven generation of run-time executable graph-based models. The method comprises obtaining a node template comprising a predetermined node structure and one or more rules governing generation of node instances based on the node template. The method further comprises receiving, by the processing circuitry, one or more data elements and, in response to the one or more data elements being received, generating a first run-time node comprising the node template and a first node instance, wherein the first node instance comprises the one or more data elements mapped to the node template based on the one or more rules of the node template. The method further comprises obtaining a first run-time overlay comprising an overlay template and a first overlay instance comprising processing logic implementing at least one generic rule of the overlay template. The method further comprises generating a first executable run-time node comprising a composition of the first run-time node and the first run-time overlay such that the processing logic of the first run-time overlay is operable to interact with the first run-time node during execution of the first executable run-time node.

According to a further aspect of the present disclosure, there is provided a method for loading run-time nodes of a template-based executable graph-based model. The method comprises obtaining a node instance manifest state based on a first unique node identifier associated with a node instance, wherein the node instance manifest state comprises a second unique node identifier associated with a node template. The method further comprises generating a node instance manifest from the node instance manifest state, wherein the node instance manifest comprises a first storage location and the first unique node identifier. The method further comprises obtaining the node template based on the second unique node identifier associated with the node template. The method further comprises obtaining a node instance state from the first storage location and generating the node instance from the node instance manifest, the node instance state, and the node template. The method further comprises generating a run-time node comprising a composition of the node instance and the node template.

According to an additional aspect of the present disclosure there is provided a method for storage management of template-based executable graph-based models. The method comprises obtaining a run-time node comprising a node template and a node instance generated according to the node template, wherein the node template is associated with a first unique node identifier and the node instance is associated with a second unique node identifier. The method further comprises extracting a node template state from the node template, wherein the node template state comprises the first unique node identifier. The method further comprises extracting a node instance state from the node instance, wherein the node instance state comprises the first unique node identifier and the second unique node identifier. The method further comprises determining a storage location for each of the node template state and the node instance state and generating a node template manifest associated with the node template, wherein the node template manifest comprises the first unique node identifier and the storage location for the node template state. The method further comprises generating a node instance manifest associated with the node instance, wherein the node instance manifest comprises the first unique node identifier, the second unique node identifier, and the storage location for the node instance state. The method further comprises generating a node template manifest state for the node template manifest, wherein the node template manifest state comprises the first unique node identifier. The method further comprises generating a node instance manifest state for the node instance manifest, wherein the node instance manifest state comprises the first unique node identifier and the second unique node identifier. The method further comprises storing the node template manifest state and the node instance manifest state.

Additional aspects and embodiments of the present systems are disclosed, and the above aspects and embodiments should not be construed as limiting the present disclosure.

BRIEF DESCRIPTION OF FIGURES

Embodiments of the present disclosure will now be described, by way of example only, and with reference to the accompanying drawings, in which.

DETAILED DESCRIPTION

Figure 1:
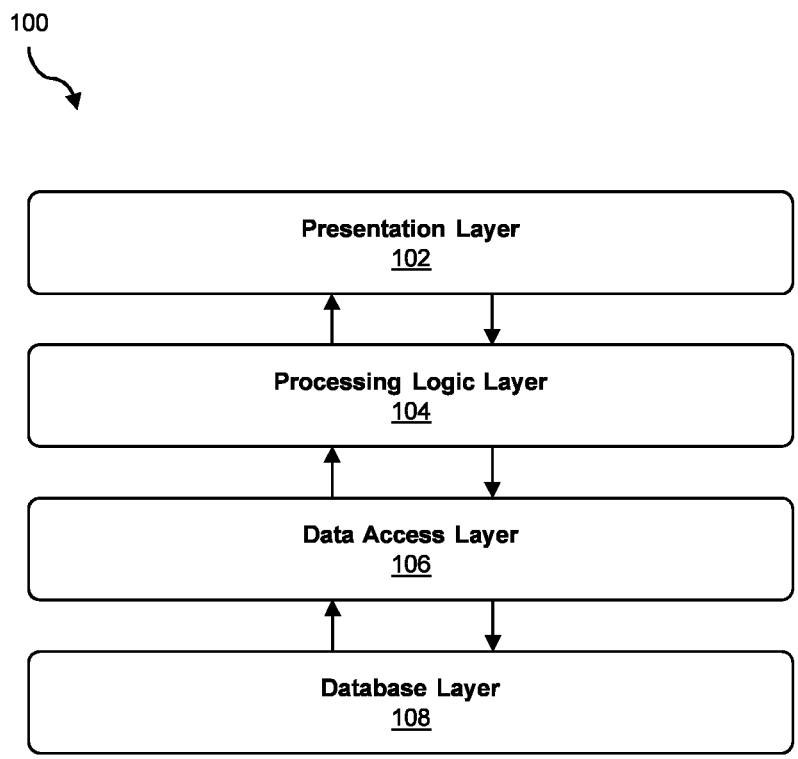
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic can be inhibitive to the types of architectural systems that can be created. Furthermore, the complexity of n-tier architectures, and their strict separation of functionality (layers), can severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

In general, the present disclosure describes executable graph-based models which dynamically combine data and data processing functionality at run-time whilst their separability may be maintained when at rest. This is illustrated in FIG. 2.

Figure 2:
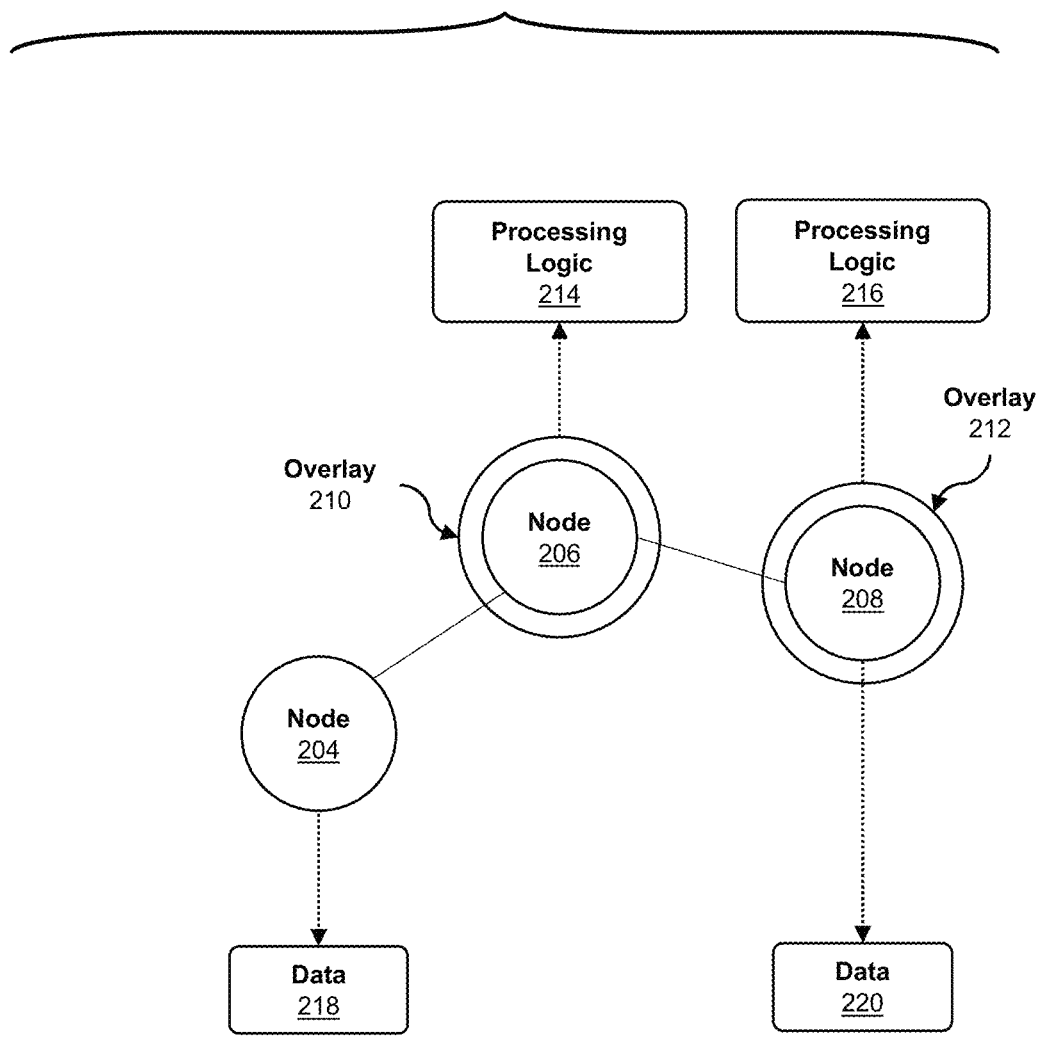
FIG. 2 shows an executable graph-based model according to an aspect of the present disclosure.

FIG. 2 illustrates an executable graph-based model 202 according to an aspect of the present disclosure.

The executable graph-based model 202 is generally formed of a data structure (i.e., a graph-based model, or graphical model) comprising a plurality of nodes 204-08 which can be functionally extended with processing logic via the use overlays 210, 212. Each overlay comprises processing logic, such as processing logic 214 and 216 which are associated with overlays 210 and 212 respectively. At run-time, data such as data 218, 220 is associated with nodes within the executable graph-based model 202 and the overlays 210, 212 provide the functionality to respond to stimuli an interact with, manipulate, or otherwise process the data. As such, the structure and functionality of the data processing is separate from the data itself when offline (or at rest) and is combined dynamically at run-time.

As such, the executable graph-based model 202 maintains separability of the data and the data processing logic when offline thereby allowing the data to maintain control over their data. Moreover, by integrating the data and the data processing logic within a single model, processing delays or latency are reduced because the data and the processing logic exist within the same logical system. Therefore, the executable graph-based model 202 is applicable to a range of time-critical systems where efficient processing of stimuli is required.

Figure 3:
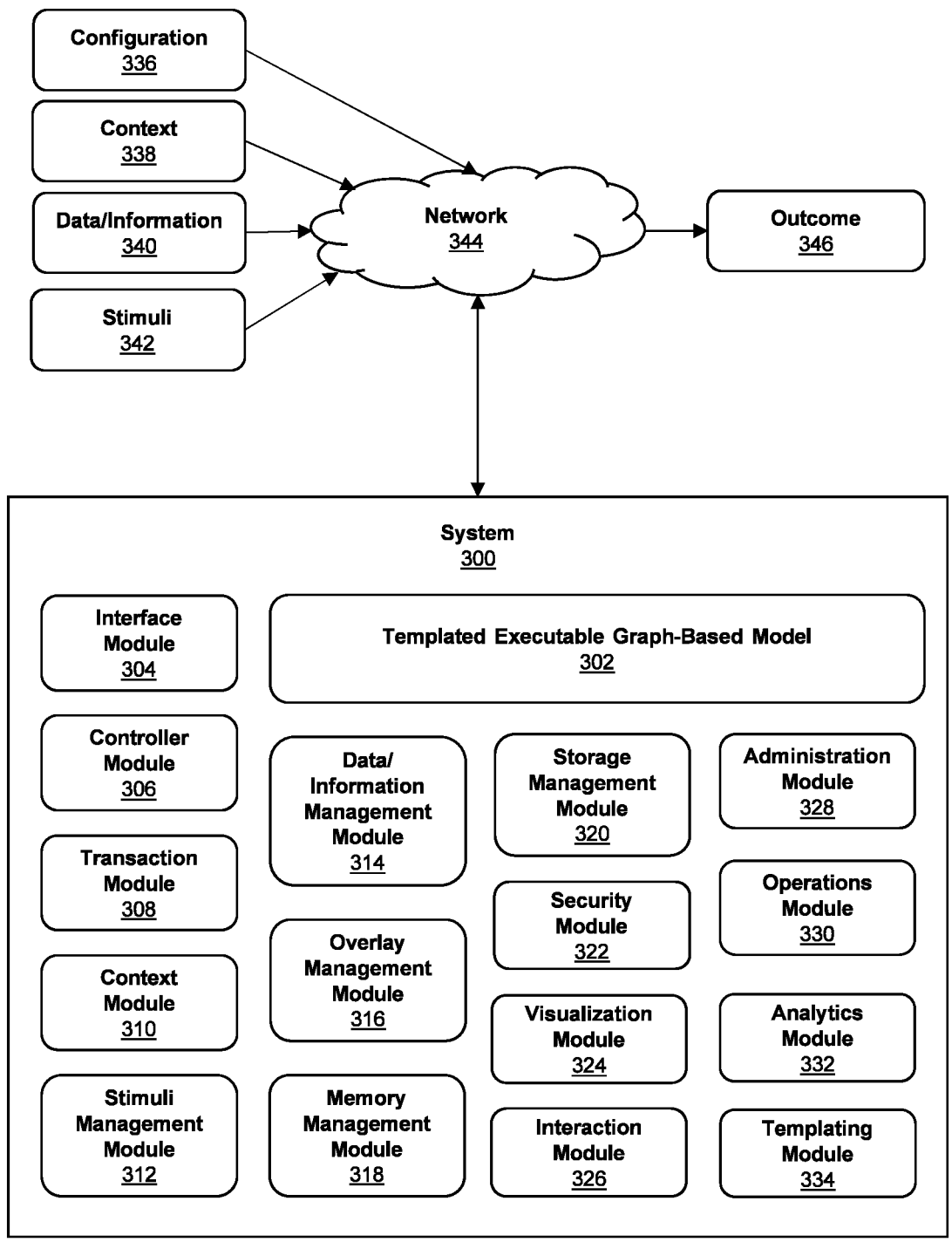
FIG. 3 shows a system for template-driven executable graph-based models according to an aspect of the present disclosure.

Existing approach to utilizing executable graph-based models, such as that shown in FIG. 2, do so according to a "freeform" ontology. That is, such models can be used with structured, or unstructured data, and the data defined with the models represent a "freeform" ontological representation of the data for the problem space. Here, a "freeform" ontology refers to the case whereby the executable graph-based model may partially or fully represent a known ontology (or a custom ontology) for the problem space, but no predefined structure or rules govern what data can be added to the model. However, many problem domains may benefit, or even require, a predefined ontology with well-defined rules to be employed when models are generated. The present disclosure is directed to systems and methods for utilizing templates to create and configure executable graph-based models. FIG. 3 shows a system 300 for template-driven execution, management, and configuration of executable graph-based models according to an aspect of the present disclosure.

The system 300 comprises a templated executable graph-based model 302 as described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, an analytics module 332, and a templating module 334. FIG. 3 further shows a configuration 336, a context 338, data 340, stimuli 342, a network 344, and an outcome 346.

The skilled person will appreciate that the present description of the system 300 is not intended to be limiting, and the system 300 can include, or interface with, further modules not expressly described herein. Moreover, the functionality of two or more of the modules can be combined within a single module. Conversely, the functionality of a single module can be split into two or more further modules which can be executed on two or more devices. The modules described below in relation to the system 300 can operate in a parallel, distributed, or networked fashion. The system 300 can be implemented in software, hardware, or a combination of both software and hardware. Examples of suitable hardware modules include, a general-purpose processor, a field programmable gate array (FPGA), and/or an application specific integrated circuit (ASIC). Software modules can be expressed in a variety of software languages such as C, C++, Java, Ruby, Visual Basic, Python, and/or other object-oriented, procedural, or other programming language.

The templated executable graph-based model 302 corresponds to the application specific combination of data and processing functionality which is manipulated, processed, and/or otherwise handled by the other modules within the system 300. As stated above, the structure and functionality of the data processing is separate from the data itself when offline (or at rest) and is combined dynamically at run-time. As such, different executable graph-based models are utilized for different application areas and problem domains. The skilled person will appreciate that whilst only one templated executable graph-based model 302 is shown in FIG. 3, in some embodiments a system stores and maintains more than one executable graph-based model.

All elements within the templated executable graph-based model 302 (both the data and the data processing functionality) are nodes. As will be described in more detail in relation to FIG. 4A below, a node forms the fundamental building block of all executable graph-based models. As such, the templated executable graph-based model 302 comprises one or more nodes which can be dynamically generated, extended, or processed by one or more other modules within the system 300 (e.g., by the data management module 314 and/or the overlay management module 316).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 336, the context 338, the data 340, and the stimuli 342 are received by the interface module 304 of the system 300 via the network 344. Similarly, outputs produced by the system 300, such as the outcome 346, are passed by the interface module 304 to the network 344 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the templated executable graph-based model 302 and the like. In one embodiment, the interface module 304 is communicatively coupled (i.e., connected either directly or indirectly) to one or more overlays within the templated executable graph-based model 302.

The controller module 306 handles and processes interactions and executions within the system 300. As will be described in more detail below, stimuli (and their associated contexts) provide the basis for all interactions within the templated executable graph-based model 302. Processing of such stimuli may lead to execution of processing logic associated with one or more overlays within the templated executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 342) and processes them based on a corresponding context (e.g., the context 338). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the templated executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 338) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 can be external or internal. While some contexts apply to all application areas and problem spaces, some applications may require specific contexts to be generated and used to process received stimuli. As will be described in more detail below, the templated executable graph-based model 302 is configurable (e.g., via the configuration 336) so as only to execute within a given execution context for a given stimulus.

The stimuli management module 312 processes externally received stimuli (e.g., the stimuli 342) and any stimuli generated internally from any module within the system 300. The stimuli management module 312 is communicatively coupled (i.e., connected either directly or indirectly) to one or more overlays within the templated executable graph-based model 302 to facilitate processing of stimuli within the templated executable graph-based model 302. The system 300 utilizes different types of stimuli such as a command (e.g., a transactional request), a query, or an event received from an external system such as an Internet-of-Things (IoT) device. As previously stated, a stimulus can be either externally or internally generated. For example, a stimulus can be an event internally triggered (generated) from any of the modules within the system 300. Such internal stimuli indicate that something has happened within the system 300 such that subsequent handling by one or more other modules within the system 300 may be required. Internal stimuli can also be triggered (generated) from execution of processing logic associated with overlays within the templated executable graph-based model 302. The stimuli management module 312 communicates and receives stimuli in real-time or near-real-time. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 336) or dynamically determines what processing needs to be performed based on the contexts associated with the stimuli and/or based on the state of the templated executable graph-based model 302. In some examples, processing of a stimulus results in one or more outcomes being generated (e.g., the outcome 346). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 340) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the templated executable graph-based model 302). The overlay management module 316 is communicatively coupled (i.e., connected either directly or indirectly) to one or more other modules within the system 300 to complete some or all of these operations. For example, overlays can be persisted in some form of physical storage using the storage management module 320 (as described in more detail below). As a further example, overlays can be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 336) independently to the requirements for one or more of modules of the system 300. For example, data priority and an eviction strategy, such as least-frequently-used ("LFU") or least-recently-used ("LRU"), can be configured for all or parts of the templated executable graph-based model 302. In one embodiment, the memory management module 318 is communicatively coupled (i.e., connected either directly or indirectly) to one or more overlays within the templated executable graph-based model 302.

The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 can directly address the computer readable medium (e.g., hard disk drive, external disk drive, or the like) upon which the data is being read or written. Alternatively, the storage management module 320 is connected to the storage device via a network such as the network 344 shown in FIG. 3. As will be described in more detail below in relation to FIGS. 9A-9D and 10, the storage management module 320 uses "manifests" to manage the interactions between the storage device and the modules within the system 300. In one embodiment, the storage management module 320 is communicatively coupled (i.e., connected either directly or indirectly) to one or more overlays within the templated executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 can enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 can implement one or more layers of data protection to ensure that the PII or PHI are correctly processed and stored. In an additional example, in implementations whereby the system 300 operates on United States of America citizen medical data, the security module 322 can enforce additional protections or policies as defined by the United States Health Insurance Portability and Accountability Act (HIPAA). Similarly, if the system 300 is deployed in the European Union (EU), the security module 322 can enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the templated executable graph-based model 302 thereby directly connecting security execution to the data/information in the templated executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the templated executable graph-based model 302 and other parts of the system 300. As described in more detail below in relation to FIGS. 7A-7C, the visualization module 324 provides one or more displays, or visualizations, of the templated executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the templated executable graph-based model 302.

The administration module 328 manages all configurable aspects of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 336). Such dynamic configurations are controllable and changeable by an end-user with the appropriate administrative privileges. In one embodiment, the degree of administrative privileges associated with an end-user are contained within a received context (e.g., the context 338). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the templated executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the templated executable graph-based model 302.

The analytics module 332 performs any analytical processing required by the modules within the system 300. The analytics module 332 processes any data embedded, or overlay contained, within the templated executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the templated executable graph-based model 302.

The templating module 334 performs operations in relation to template-driven generation of executable graph-based models. For example, the templating module 334 is used to generate specific instances of nodes from predefined templates. That is, the templating module 334 ensures ontology integrity by enforcing the structure and rules of a template when generating instances of the template at runtime. As such, the templating module 334 is communicatively coupled (i.e., connected either directly or indirectly) to one or more nodes and/or one or more overlays within the templated executable graph-based model 302.

Having now described the system 300 for executing and managing executable graph-based models, the description will now turn to the elements of a templated executable graph-based model; specifically, the concept of templates and instances.

Figure 4A:
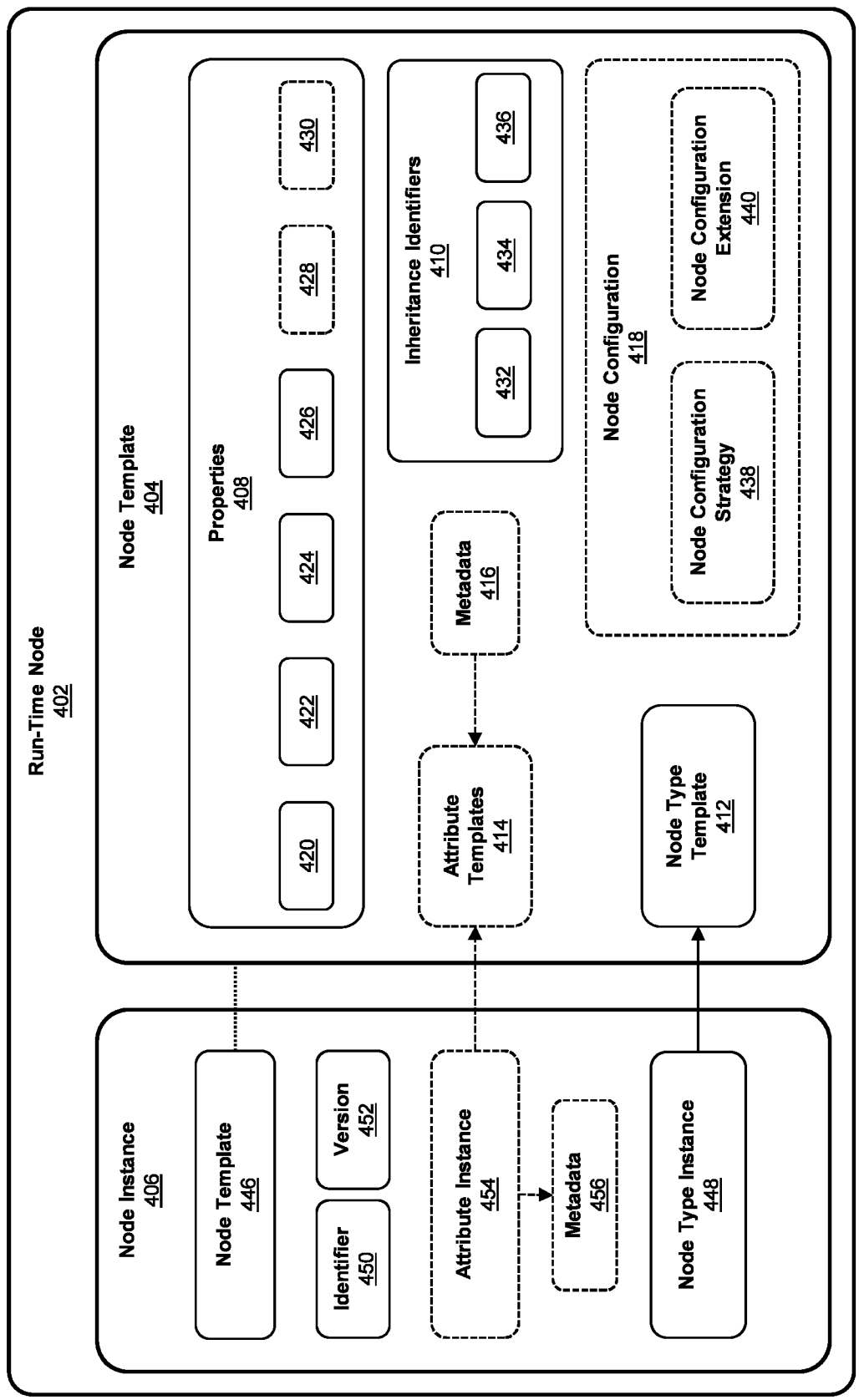
FIG. 4A shows the general structure of a run-time node according to an aspect of the present disclosure.

FIG. 4A shows the general structure of a run-time node 402 according to an aspect of the present disclosure.

The run-time node 402 comprises a composition of a node template 404 and a node instance 406 generated according to the node template 404. The run-time node 402 shown in FIG. 4A is a compositional structure which is generated, and executed, at run-time as part of a templated (template-based or template-driven) executable graph-based model (e.g., the templated executable graph-based model 302 shown in FIG. 3). That is, whilst the node template 404 is defined "offline", the node instance 406 and run-time node 402 are run-time structures which are dynamically generated during execution of a templated executable graph-based model.

The node template 404 comprises properties 408, inheritance identifiers 410, and node type template 412. The node template 404 optionally comprises attribute templates 414, metadata 416, and a node configuration 418. The properties 408 of the node template 404 include a unique identifier 420, a version identifier 422, a namespace 424, and a name 426. The properties 408 optionally include one or more icons 428 and one or more labels 430. The inheritance identifiers 410 of the node template 404 comprise an abstract flag 432, a leaf flag 434, and a root flag 436. The node configuration 418 optionally comprises one or more node configuration strategies 438 and one or more node configuration extensions 440. The node instance 406 comprises a node template 446 and a node type instance 448. The node instance 406 also comprises properties including a unique identifier 450 and a version identifier 452. The node instance 406 optionally comprises attribute instances 454 and metadata 456.

The node template 404 and the node instance 406 form the foundation for all objects within a template-driven executable graph-based model. The node template 404 defines all the structural and behavioral aspects of an ontology. That is, the node template 404 defines what is allowed for the run-time node 402 when generated as part of an executable graph-based model. The node template 404 may thus be considered to comprise a predetermined node structure and define one or more rules which govern generation of node instances which are based on the node template 404. The node instance 406 is the actual instance implementation of the node template 404 (and its corresponding definitions) for the run-time node 402. That is, the node instance 406 is generated according to the predetermined node structure and one or more rules of the node template 404. Every node instance is associated with a node template; but a node template need not be associated with a node instance. As shown in FIG. 4A, the node instance 406 is associated with a single node template (i.e., the node template 404), but the node template 404 may be associated with zero or more node instances. The node template 404 is mutable in the context of template management (e.g., when part of an "offline" graph-based model or structure) but is immutable (read only) when used as part of the run-time node 402 during execution—i.e., during execution, only the node instance 406 of the run-time node 402 may be modified. The run-time node 402 may be represented as a façade which encapsulates the data and capabilities of the node template 404 and the node instance 406 and delegates responsibilities accordingly. That is, the run-time node 402 does not contain any data, and does not perform any of the capabilities, directly.

The unique identifier 420 is unique for each node template within an executable graph-based model. Similarly, the unique identifier 450 is unique for each node instance within an executable graph-based model. That is, a node instance does not share the identifier of its associated node template. The unique identifier 420 and the unique identifier 450 are used to register, manage, and reference the node template 404 and the node instance 406 within the system (e.g., the system 300 of FIG. 3). The version identifier 422 of the node template 404 is incremented when the node template 404 undergoes transactional change. Similarly, the version identifier 452 of the node instance 406 is incremented when the node instance 406 undergoes transitional change. This allows the historical changes between versions of the node template 404 and/or the node instance 406 to be tracked by modules or overlays within the system. The namespace 424 of the node template 404, along with the name 426 of the node template 404, is used to help organize node templates within the executable graph-based model. That is, the node template 404 is assigned a unique name 426 within the namespace 424 such that the name 426 of the node template 404 need not be unique within the entire executable graph-based model, only within the context of the namespace 424 to which the node template 404 is assigned.

The node template 404 optionally comprises one or more icons 428 which are used to provide a visual representation of the node template 404 when visualized (e.g., by the visualization module 324 of the system 300 shown in FIG. 3). The one or more icons 428 can include icons at different resolutions and display contexts such that the visualization of the node is adapted to different display settings and contexts. The node template 404 also optionally comprises one or more labels 430 which are used to override the name 426 when the node template is rendered or visualized.

The node template 404 supports the software development feature of multiple inheritance by maintaining references (not shown) to zero or more other node templates, which then act as the base of the node template 404. This allows the behavior and functionality of a node template to be extended or derived from one or more other node templates within an executable graph-based model. The node instance 406 likewise supports multiple inheritance because it is an instance representation of the node template 404. The multiple inheritance structure of the node instance 406 is, however, limited to the corresponding instance realization of the multiple inheritance structure defined by the node template 404—i.e., one node instance is created and managed for each node template defined in the inheritance hierarchy for a node instance of a node template. The inheritance identifiers 410 of the node template 404 provide an indication of the inheritance-based information, which is applicable, or can be applicable, to the node template 404. The inheritance identifiers 410 comprise a set of Boolean flags which identify the inheritance structure of the node template 404. The abstract flag 432 of the inheritance identifiers 410 allows the node template 404 to support the construct of abstraction. When the abstract flag 432 takes a value of "true", the node template 404 is flagged as abstract meaning that it cannot be instantiated or created within an executable graph-based model. Thus, a node template having the abstract flag 432 set to "true" can only form the foundation of another node template that inherits from it. By default, the abstract flag 432 of a node template is set to "false". The leaf flag 434 of the inheritance identifiers 410 is used to indicate whether any other node template can inherit from the node template 404. If the leaf flag 434 is set to "true", then no other node template can inherit from the node template 404 (but unlike an abstract node, a node template with a leaf flag set can still be instantiated and created within an executable graph-based model). The root flag 436 of the inheritance identifiers 410 is used to indicate whether the node template 404 inherits from any other node template. If the root flag 436 is set to "true", then the node template 404 does not inherit from any other node template. The node template 404 is flagged as leaf (i.e., the leaf flag 434 is set to "true") and/or root (i.e., the root flag 436 is set to "true"), or neither (i.e., both the leaf flag 434 and the root flag 436 are set to "false"). The skilled person will appreciate that a node template cannot be flagged as both abstract and leaf (i.e., the abstract flag 432 cannot be set to "true" whilst the leaf flag 434 is set to "true").

All elements of a templated executable graph-based model are defined as nodes-node templates or node instances. This functionality is in part realized due to the use of a node type. In general, a node type imbues a node template/instance with common data structures and/or functionality such that all node templates/instances having that node type share the common data structures and/or functionality. A node type comprises two components: a node type template (e.g., the node type template 412) and a corresponding node type instance (e.g., the node type instance 448), which is an implementation of the node type template. This enables multiple implementations of a template's core structure and functionality to be realized. Each node template comprises a single node type template. Similarly, each node instance comprises a single node type instance associated with a node type template. That is, a node type instance, associated with a node instance, is associated with a node type template of a node template for the node instance.

The node type template 412 of the node template 404 is used to extend the functionality of the node template 404 by defining the standard set of capabilities, including data and associated behavior, for the specialized node type it will represent. For example, a node type template associated with a data node type will define the standard capabilities for the node template (and corresponding node instance) which take this node type. The node type instance 448 is an instance of the node type template 412 definition and holds any instance data or instance specific behavior. Example node types include a data node type, a value node type, and an overlay node type. As will be described in more detail below, the overlay node type is used to extend the functionality of a node to incorporate default data-oriented processing logic.

The attribute templates 414 correspond to the data defined by the node template 404. For example, the attribute templates 414 may define the names and value types (e.g., integer, string, float, etc.) of one or more attributes but not the values of these attributes. The values of the attribute templates 414 may be defined by the attribute instances 454 of the node instance 406 through one or more values or instance values. For example, a node template may define a string attribute "surname" and a corresponding node instance may assign the instance value "Bell-Richards" to this string attribute. Each attribute instance is associated with an attribute template. The node template 404 may define one or more default values for the attribute templates 414. The default values correspond to the values that the attributes take if no value is assigned. The node template 404 also optionally comprises metadata 416 (e.g., data stored as a name, value type, and value triplet) which is associated with either the node template 404 or one or more of the attribute templates 414 of the node template 404. Similarly, the node instance 406 also optionally comprises metadata 456 (e.g., data stored as a name, value type, and value triplet) which is associated with either the node instance 406 or one or more of the attribute instances 454.

The node configuration 418 provides a high degree of configurability for the different elements of a node template and/or a node instance. The node configuration 418 optionally comprises one or more node configuration strategies 438 and/or one or more node configuration extensions 440. An example of a concrete node configuration strategy is an identifier strategy, associated with the configuration of the unique identifier 420 of the node template 404 and/or the configuration of the unique identifier 450 of the node instance 406, which creates Snowflake identifiers. A further example of a concrete node configuration strategy is a versioning strategy, associated with the configuration of the version identifier 422 of the node template 404 and/or the version identifier 452 of the node instance 406, which supports major and minor versioning (depending on the type of transactional change incurred).

According to an aspect of the present disclosure, the structure and functionality of the run-time node 402, the node template 404, and/or the node instance 406 can be dynamically extended using the concept of overlays to generate executable nodes—i.e., executable run-time nodes, executable node templates, and executable node instances. As described in relation to FIGS. 4B-4D below, executable nodes provide processing functionality (i.e., processing logic) for a base node, such as a run-time node, a node template, or a node instance, via one or more associated overlays.

Figure 4B:
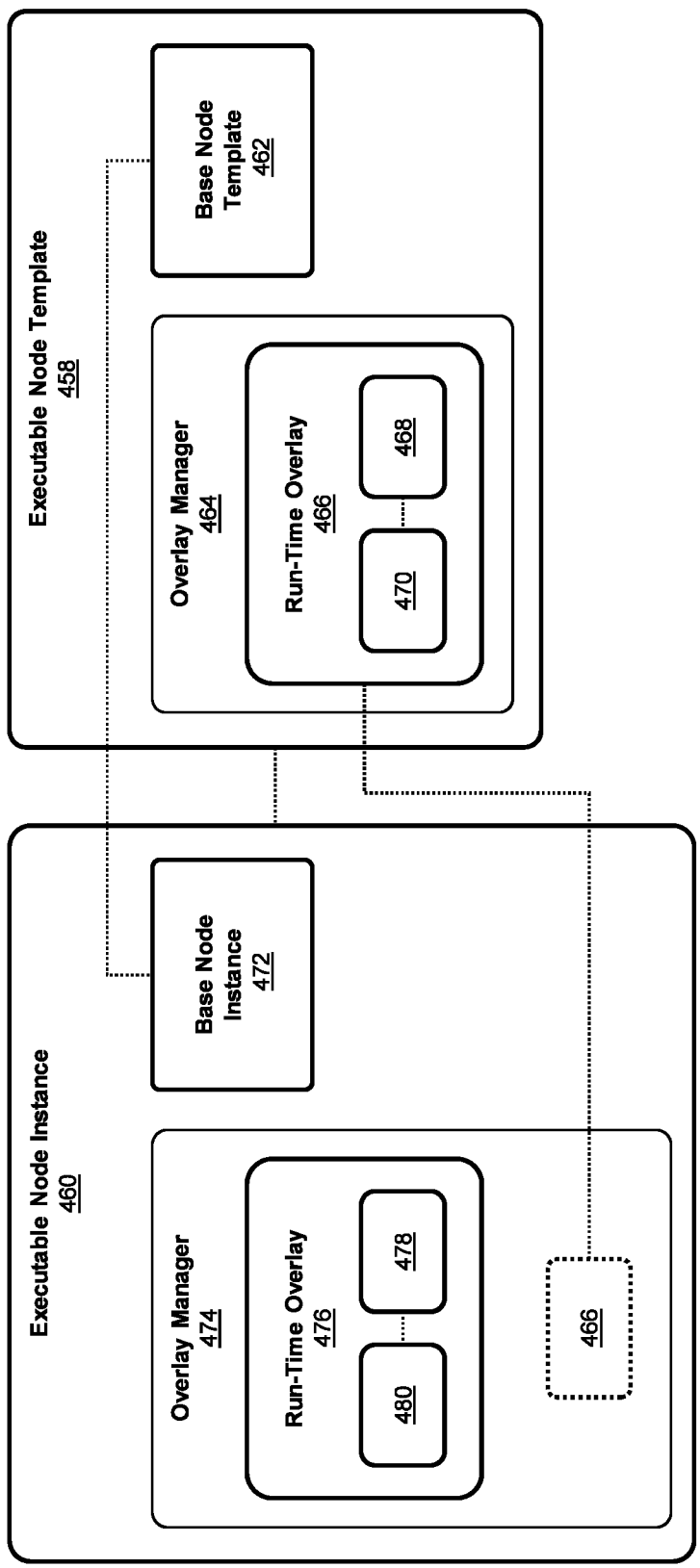
FIG. 4B shows an executable node template and an executable node instance according to an aspect of the present disclosure.

FIG. 4B shows an executable node template 458 and an executable node instance 460 according to an aspect of the present disclosure.

The executable node template 458 comprises a base node template 462 and an overlay manager 464. The overlay manager 464 maintains one or more run-time overlays such as the first run-time overlay 466 which comprises a first overlay template 468 and a first overlay instance 470. The executable node instance 460 comprises a base node instance 472 and an overlay manager 474. The overlay manager 474 maintains one or more run-time overlays such as the second run-time overlay 476 which comprises the second overlay template 478 and the second overlay instance 480. In the example shown in FIG. 4B, the second overlay template 478 is owned by the base node template 462 (the skilled person will appreciate that this ownership relation exists but is not shown in FIG. 4B for brevity).

The executable node instance 460 is associated with (i.e., is an instance of) the executable node template 458 and the base node instance 472 is associated with (i.e., is an instance of) the base node template 462. These relationships are indicated by the dashed connecting lines in FIG. 4B. Moreover, the overlay manager 474 of the executable node instance 460 maintains a reference to the first run-time overlay 466 associated with the executable node template 458, if the executable node template 458 acts on instance information contained in the executable node instance 460. For example, the executable node template 458 may be an encryption overlay with the encryption defined by the first overlay template 468 and with specified encryption settings defined by the first overlay instance 470. In such an example, the first run-time overlay 466 is applied to the processing of attribute instances associated to the base node instance 472. Alternatively, if the first run-time overlay 466 acts only on the base node template 462 structure (void of a corresponding instance) then there is no need for the overlay manager 474 to hold a reference to the first run-time overlay 466.

The executable node template 458 and the executable node instance 460 dynamically extend the functionality of the base node template 462 and the base node instance 472 by associating the run-time overlays registered with the respective overlay managers with the base nodes (i.e., the base node template 462 and the base node instance 472). As will be described in more detail below, a run-time overlay is used to extend the functionality of a node to incorporate processing logic defined within the run-time overlay. Thus, the first run-time overlay 466 extends the functionality of the base node template 462 by incorporating processing logic, defined within the first run-time overlay 466, such that the processing logic interacts with the base node template 462 at run-time (e.g., for template building or processing performed outside of an associated node instance). Similarly, the second run-time overlay 476 extends the functionality of the base node instance 472 by incorporating processing logic, defined within the second run-time overlay 476, such that the processing logic interacts with the base node instance 472 and/or the base node template 462 at run-time. Here, processing logic corresponds to any suitable executable or interpretable code or software component. The processing logic may be expressed in a variety of software languages such as C, C++, Java, Ruby, Visual Basic, Python, and/or other object-oriented, procedural, or other programming language.

The executable node template 458 and the executable node instance 460 are dynamic structures which are generated during execution of a templated executable graph-based model. During execution, an overlay manager connected to an executable node template or instance is operable to receive and process stimuli (e.g., messages or events sent from other components within the system) and trigger the processing logic of one or more run-time overlays maintained by the overlay manager. The overlay manager of an executable node template handles template only stimuli or requests, whilst the overlay manager of an executable node instance handles instance only stimuli or requests.

The executable node template 458 may comprise one or more run-time overlays which are associated only with the base node template 462 and are not used or loaded for instance processing (i.e., they are not used or loaded with respect to the base node instance 472). As such, the overlay manager 464 may comprise a run-time overlay (not shown) which is not referenced by the overlay manager 474 of the executable node instance 460 but is used in the construction of the template definition. For example, the run-time overlay may be a validation overlay used to ensure that the base node template 462 is validly generated.

Each run-time overlay is itself a run-time node composed of a node template and a node instance which have an overlay node type. An overlay template is a node template having an overlay node type template and an overlay instance is a node instance which corresponds to a specific implementation of the overlay template (e.g., within the context of the run-time node 402 of FIG. 4A, the node type template 412 of the node template 404 is an overlay type template and the node type instance 448 of the node instance 406 is an implementation of the overlay type template defined by the node type template 412). The overlay template comprises one or more generic rules which may be implemented by the processing logic of the overlay instance. For example, a rule may be defined in an overlay template specifying that hashing algorithm is to be used and an overlay instance related to the overlay template provides a specific implementation of a hashing algorithm (e.g., MD5, SHA-1, SHA-2, etc.). The overlay template itself may further comprise processing logic or derive additional data maintained by the overlay instance portion. As such, the overlay node type extends a node template or instance by allowing processing logic or additional data to be defined and linked to the node template or instance.

Figure 4C:
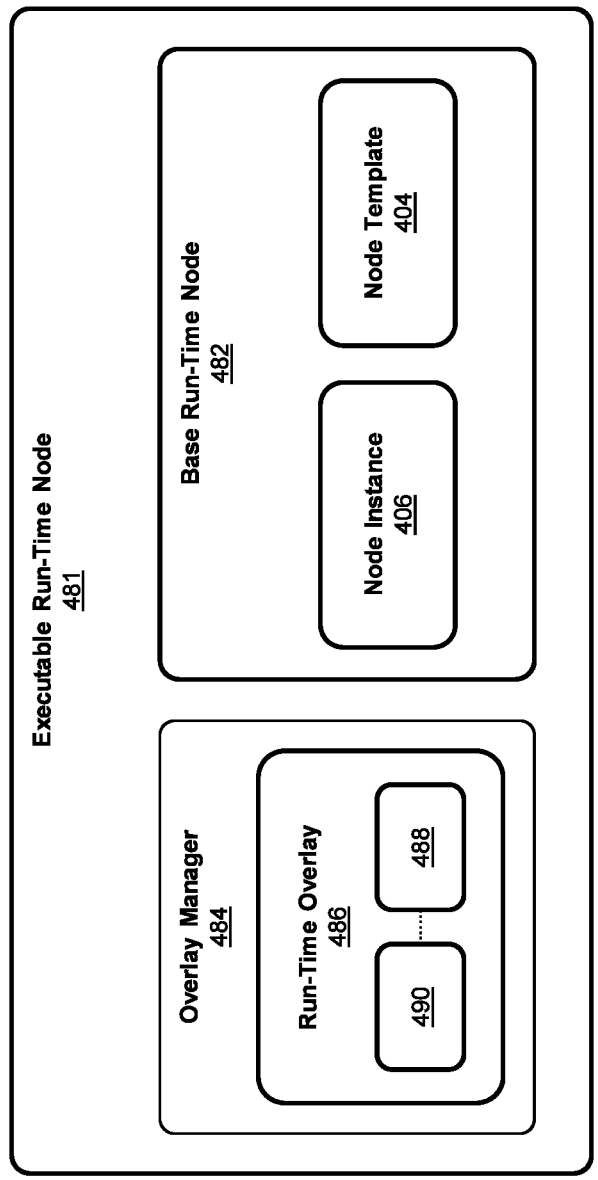
FIG. 4C shows an executable run-time node according to an aspect of the present disclosure.

FIG. 4C shows an executable run-time node 481 according to an aspect of the present disclosure.

The executable run-time node 481 comprises a base run-time node 482 and an overlay manager 484. The base run-time node 482 corresponds to the run-time node 402 shown in FIG. 4A and comprises a composition of the node template 404 and the node instance 406. The overlay manager 484 maintains one or more run-time overlays including a third run-time overlay 486 which comprises a third overlay template 488 and a third overlay instance 490.

The executable run-time node 481 is generated at run-time and dynamically extends the functionality of the base run-time node 482—i.e., the functionality of the node template 404 and/or the node instance 406-by associating the run-time overlays managed by the overlay manager 484 with the base run-time node 482. As such, the third run-time overlay 486 is operable to interact at run-time with the node template 404 and/or the node instance 406 of the base run-time node 482.

In the example shown in FIG. 4C, the node template 404 and the node instance 406 are not executable nodes. That is, neither the node template 404 nor the node instance 406 comprise an overlay manager with one or more run-time overlays. However, as described in relation to FIG. 4D below, the node template 404 and/or the node instance 406 may themselves be executable nodes thereby extending the functionality, complexity, and configurability of executable run-time nodes.

Figure 4D:
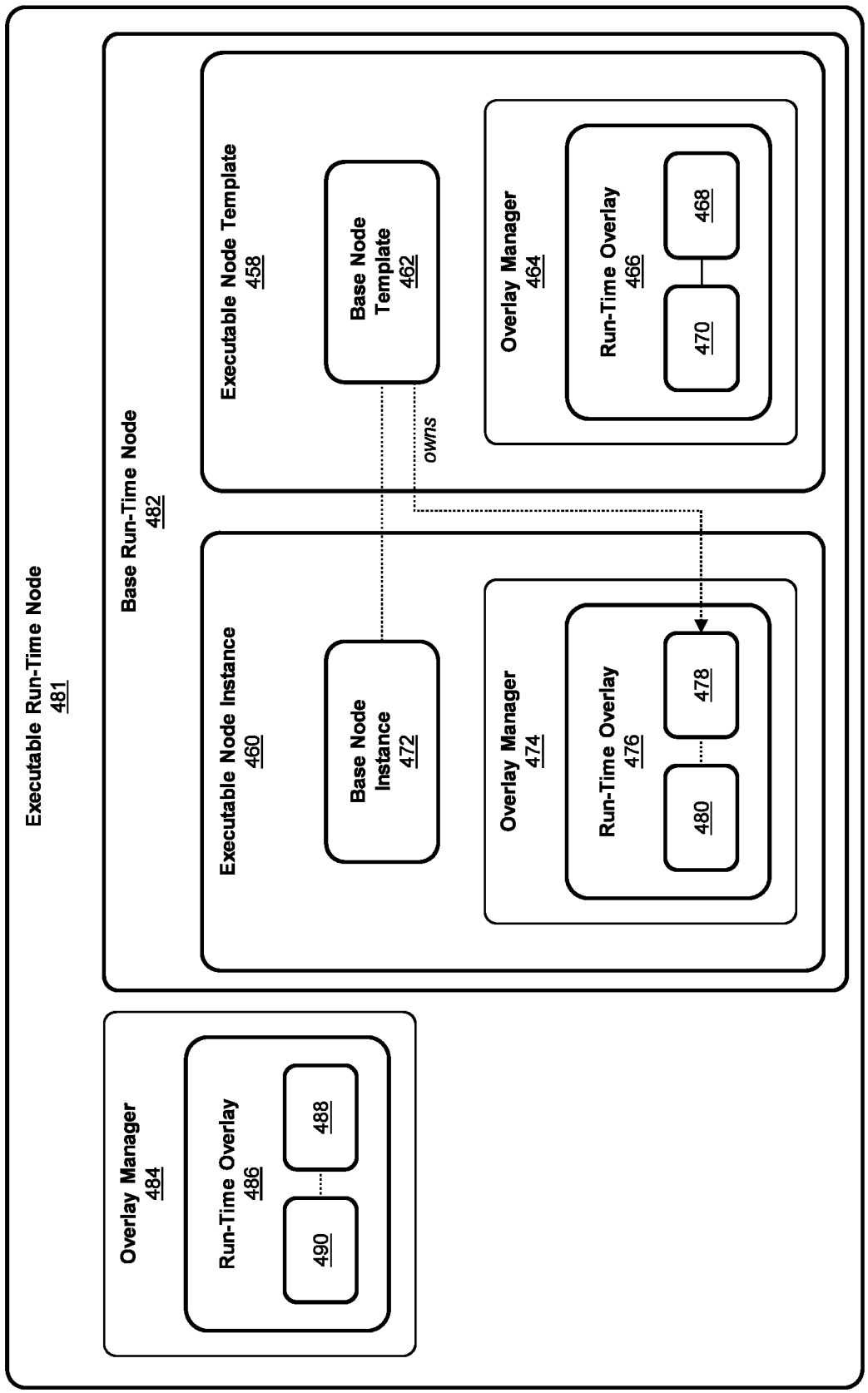
FIG. 4D shows the executable run-time node of FIG. 4C but with one or more executable nodes within the base run-time node according to an aspect of the present disclosure.

FIG. 4D shows the executable run-time node 481 of FIG. 4C but with one or more executable nodes within the base run-time node 482 according to an aspect of the present disclosure.

The executable run-time node 481 comprises the base run-time node 482 and the overlay manager 484 as described above in relation to FIG. 4C. However, as shown in FIG. 4D, the base run-time node 482 comprises a composition of the executable node template 458 and the executable node instance 460 shown in FIG. 4B. The executable run-time node 481 is generated at run-time and dynamically extends the functionality of the base run-time node 482—i.e., the functionality of the executable node template 458 and/or the executable node instance 460-by associating the run-time overlays managed by the overlay manager 484 with the base run-time node 482 (as shown in FIG. 4C).

In general, an overlay template is defined independently of a node template or a node instance and may be associated with one or more node templates or node instances (i.e., based on configuration rules as described below). The corresponding overlay instance associated to each overlay template may also be defined as being created and owned by a node template or a node instance (i.e., based on configuration rules as described below). For example, an executable node template may comprise a run-time overlay which includes both an overlay template and an overlay instance (i.e., an implementation of the node template). In FIG. 4D, this is illustrated by the first run-time overlay 466 which comprises both the first overlay template 468 and the first overlay instance 470. As will be described in more detail below, the run-time overlay in such a scenario may be limited to interacting with the structure and/or data of the base node template only (e.g., the base node template 462), or may interact with the structure and/or data of the base node instance (e.g., the base node instance 472). Alternatively, a node template may be associated with an overlay template, but the node instance is implemented or associated with a node instance. That is, the run-time overlay involving the node template is generated in conjunction with the node instance. In FIG. 4D, this is illustrated by the second run-time overlay 476 which comprises the second overlay template 478 which is owned (associated) with the base node template 462, as indicated by the dashed arrow, and the second overlay instance 480 which is associated with the base node instance 472.

As such, the construction and generation of an executable run-time node and/or an executable node template based on an overlay template may depend on the specific configuration of the overlay template. More particularly, the creation and generation may depend on ownership relations of the overlay template, scope of processing of the overlay template, and/or association restrictions of the overlay template.

An overlay template may be either owned or shared. If the overlay template is owned by a node template, then the overlay template may only ever be associated with the node template. That is, the overlay template may only be included as part of a run-time overlay associated with an executable node template involving the node template as the base node template. In such a scenario, the overlay template may define specific processing logic or rules associated to the definition(s) provided in the node template which owns the overlay template. If the overlay template is shared, then it can be associated to zero or more node templates or node instances. In this scenario, the node template may have generic processing logic or rules not directly tied to any node template or node instance.

An overlay template may have scope of processing limited to act in relation to the node template, the node instance, or the run-time node (i.e., both the node template and the node instance). For example, if the overlay template is limited to act in relation to the node template, then the processing logic or rules of the overlay template cannot be used to interact with an executable node instance.

An overlay template (if shared) may be restricted to be associated with only node templates, node instances, or run-time nodes (i.e., both node templates and node instances). For example, if the overlay template is restricted to the node template, then a run-time overlay comprising the overlay template cannot be associated with a node instance. Similarly, an overlay template restricted to the node instance cannot be associated with a node template.

With the above in mind, there are several configuration scenarios in relation to run-time overlays which may arise when generating executable run-time nodes. The configuration scenarios relate to the ownership relationships, association restrictions, and processing scope of an overlay template.

An ownership relationship (referred to below and in the figures as "owns") defines whether an overlay template is owned by a single node template or instance or may be shared by multiple node templates, instances, or is shared between node templates and node instances. If the overlay template is owned by a first node template, then the overlay template may only be associated with the first node template. This may arise in scenarios where the overlay has specific logic associated with the definition of the node provided by the first node template. If the overlay template is shared, then the overlay template may be associated with zero or more node templates and/or node instances. That is, the overlay has generic logic which is not directly tied to any node definitions. As such, the overlay works on instance data in conjunction with any structure or default data defined by the node template. Likewise, an overlay template may be owned by an instance or shared by one or more instances. In which case the overlay template is not associated to any node template.

An association restriction (referred to below and in the figures as "restriction") defines whether a shared overlay template is associated with node templates, node instances, or both node templates and node instances. If a shared overlay template has an association restriction related to the template portion (represented as "restriction: template"), then the overlay template may only be associated with zero or more node templates. The skilled person will appreciate that an overlay template which is owned by a respective node template has an association restriction limited to the respective node template. That is, a template-owned overlay template has an association restriction of [restriction: template]. If a shared overlay template has an association restriction related to the instance portion (represented as "restriction: instance"), then the overlay template may only be associated with zero or more node instances. The skilled person will appreciate that an overlay template which is owned by a respective node instance has an association restriction limited to the respective node instance. That is, an instance-owned overlay template has an association restriction of [restriction: instance]. If a shared overlay template has no association restriction (represented as "restriction: none"), then the overlay template may be associated with zero or more node templates and/or zero or more node instances.

A processing scope (referred to below and in the figures as "act") defines whether the processing performed by an overlay template acts in relation to a node template, a node instance, or both a node template and a node instance. If an overlay template has processing scope restricted to the template portion (represented as "act: template"), then the overlay template processing logic acts only in relation to the node template. For example, an audit overlay tacking changes to the node template portion. If an overlay template has processing scope restricted to the instance portion (represented as "act: instance"), then the overlay template processing logic acts only in relation to the node instance. For example, an audit overlay tacking changes to the node instance portion. If an overlay template has combined processing scope (represented as "act: combined"), then the overlay template processing logic acts only in relation to the run-time node (i.e., the composition of the node template and the node instance). For example, a validation overlay which validates an instance value of an attribute instance based on validation criteria defined by the corresponding attribute template of the node template.

The following scenarios outline the various combinations of the ownership relationship, with association restriction, and processing scope. In one embodiment, combinations which are not listed below are prevented (e.g., by the templating module 334 shown in FIG. 3) during configuration.

In a first scenario, an overlay template is owned by a node template and has a configuration of [owned, restriction: template, act: template]. In this scenario, the overlay template may only be associated with the node template and the processing logic of the overlay template acts only in relation to the node template (e.g., the first overlay template 468 shown in FIG. 4D which is associated with the base node template 462). An overlay instance (e.g., the first overlay instance 470 shown in FIG. 4D) is created for the overlay template, and the run-time overlay (e.g., the first run-time overlay 466 shown in FIG. 4D which is composed of the first overlay template 468 and the first overlay instance 470) is registered in the overlay manager of the executable node template created from the node template (e.g., the overlay manager 464 of the executable node template 458 created from the base node template 462 shown in FIG. 4D). Since the run-time overlay only acts on the template it is not loaded for any node instances associated with the node template. In the example shown in FIG. 4D, the first run-time overlay 466 is not loaded in the overlay manager 474 of the associated executable node instance 460.

In a second scenario, an overlay template is owned by a node template and has a configuration of [owned, restriction: template, act: instance]. In this scenario, whilst the overlay template is owned by the node template (e.g., the second overlay template 478 shown in FIG. 4D is owned by the base node template 462), it is configured to act in relation to a node instance generated from the node template (e.g., the base node instance 472 shown in in FIG. 4D which is generated from the base node template 462). An overlay instance is generated from the overlay template (e.g., the second overlay instance 480 generated from the second overlay template 478 in FIG. 4D), and the overlay instance is associated to the executable node instance formed from the node instance and node template (e.g., the executable node instance 460 shown in FIG. 4D). The association of the overlay instance with the executable node instance is required since the execution of the run-time overlay (e.g., the second run-time overlay 476 shown in FIG. 4D, formed from the second overlay template 478 and the second overlay instance 480) acts on the node instance and may produce additional instance data which is directly connected to the node instance or stored within the overlay instance itself (since an overlay instance is a node instance and therefore can maintain state). A run-time node is formed between the executable node instance and node template (e.g., the base run-time node 482 shown in FIG. 4D). In this scenario, the node template is not executable since it does not contain a direct run-time overlay (as illustrated in FIG. 4D). That is the run-time overlay associated with the executable node instance portion of the run-time node requires both an aspect of the node template and node instance. The skilled person will appreciate that each node instance will have its own overlay instance pertaining to the node template and overlay template defined by the node template in which it is an instance of.

In a third scenario, an overlay template is owned by a node template and has a configuration of [owned, restriction: template, act: combined]. This scenario is similar to the second scenario described above, except that the execution of the run-time overlay associated to the executable run-time node utilizes structural information contained in both the node template and node instance.

In a fourth scenario, an overlay template is owned by a node instance and has a configuration of [owned, restriction: instance, act: instance]. In this scenario, the overlay template may only be associated with the node instance and the processing logic of the overlay template acts only in relation to the node instance. An overlay instance is created for the overlay template, and the run-time overlay (formed from the overlay template and overlay instance) is registered in the overlay manager of the executable node instance created from the node instance (acting as the base node instance). In this scenario there is no executable node template as there is no overlay template, overlay instance associated with the node template.

In a fifth scenario, an overlay template is owned by a node instance and has a configuration of [owned, restriction: instance, act: combined]. This scenario is similar to the fourth scenario, except that the execution of the run-time overlay associated to the executable run-time node instance utilizes structural information contained in both the node template and node instance.

In a sixth scenario, an overlay template is shared with one or more node templates and has a configuration of [owns: shared, restriction: template, act: template]. This scenario is similar to the first scenario, except that the node template in which the overlay template is associated does not own the overlay template definition. In this scenario the overlay template would be defined to be independent on any specific node template. The creation of the overlay instance, run-time overlay, and executable node template would remain the same.

In a seventh scenario, an overlay template is shared with one or more node templates and has a configuration of [owns: shared, restriction: template, act: instance]. This scenario is similar to the second and sixth scenarios. Firstly, the overlay template would be defined to be independent of any specific node template, while the creation of the overlay instance, run-time overlay, and executable node instance would remain the same (as defined in the second scenario). That is, a unique overlay instance and corresponding unique run-time overlay would be associated with each node instance, forming a unique executable node instance, for each node instance of the node template.

In an eighth scenario, an overlay template is shared with one or more node templates and has a configuration of [owned: shared, restriction: template, act: combined]. This scenario is similar to the third and seventh scenarios. Firstly, the overlay template would be defined to be independent of any specific node template, while the creation of the overlay instance, run-time overlay, and executable node instance would remain the same (as defined in the third scenario). That is, a unique overlay instance and corresponding unique run-time overlay would be associated with each node instance, forming a unique executable node instance, for each node instance of the node template. The execution of the run-time overlay would interact with both the node instance and node template.

In a ninth scenario, an overlay template is shared with one or more node instances and has a configuration of [owned: shared, restriction: instance, act: instance]. This scenario is similar to the fourth scenario except that the node instance in which the overlay template is associated does not own the overlay template definition. In this scenario the overlay template would be defined to be independent on any specific node instance. The creation of the overlay instance, run-time overlay, and executable node template would remain the same.

In a tenth scenario, an overlay template is shared with one or more node instances and has a configuration of [owned: shared, restriction: instance, act: combined]. This scenario is similar to the fifth and ninth scenarios. Firstly, the overlay template would be defined to be independent of any specific node instance, while the creation of the overlay instance, run-time overlay, and executable node instance would remain the same (as defined in the ninth scenario). That is, a unique overlay instance and corresponding unique runtime overlay would be associated with each node instance, forming a unique executable node instance for each node instance of the node template. The execution of the run-time overlay would interact with both the node instance and node template.

In an eleventh scenario, an overlay template is shared with zero or more node template and zero or node instance and has a configuration of [owned: shared, restriction: node, act: instance/template/combined]. This scenario is similar to the seventh and ninth scenarios. Firstly, the overlay template would be defined to be independent of any specific node template or node instance. Secondly, if the overlay template is associated with one or more node templates, then scenario seven would be applied. Alternatively, scenario nine would be applied if the overlay template was associated with one or more node instances. Finally, since the overlay template can be associated with both a node instance and node template, a single run-time node could be composed of an executable node instance and executable node template each with their own run-time overlay implementation using the shared overlay template. That is, in this scenario, both the run-time overlay associated to the executable node instance and run-time overlay associated to the executable node template would each have their own overlay instance using the same overlay template. The scope of execution of each run-time overlay would be subject to the ownership of the run-time overlay. The run-time overlay associated to the node template (forming an executable node template) would have an act restricted to template while the run-time overlay associated to the node instance (forming an executable node instance) would have an act of instance or combined. At run-time, both the run-time overlay associated to the node template and the node instance are read-only, immutable, structures which cannot be modified by any node instances. The skilled person will appreciate that these structures are mutable when being created/configured "offline".

Figure 5:
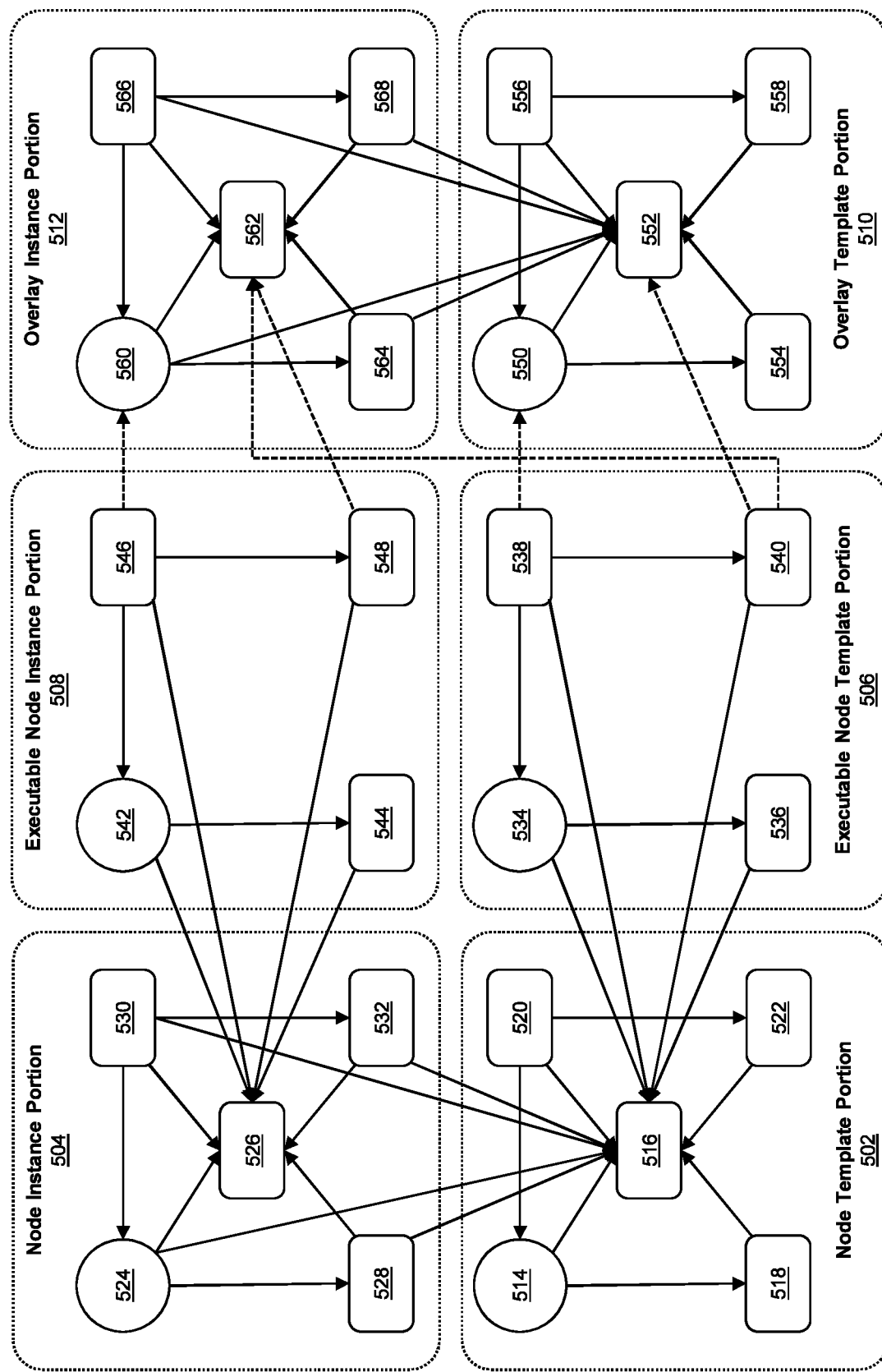
FIG. 5 shows the decomposition of an executable run-time node for storage according to an embodiment of the present disclosure.

Before describing an example template-based executable graph-based model, the description will turn to the decomposition of an executable run-time node for persistent storage, as shown in FIG. 5.

FIG. 5 shows the decomposition of an executable run-time node for storage according to an embodiment of the present disclosure.

FIG. 5 shows an executable run-time node (such as that having the structure shown in FIG. 4D) decomposed into a node template portion 502, a node instance portion 504, an executable node template portion 506, an executable node instance portion 508, an overlay template portion 510, and an overlay instance portion 512.

The node template portion 502 comprises a node template 514 which comprises a first unique node identifier 516 and a node template state 518. Throughout, the term "state" is used to refer to the data stored by a node template, node instance, or manifest. The node template portion 502 further comprises a node template manifest 520 generated from the node template 514 and a node template manifest state 522 generated from the node template manifest 520. Throughout, the term "manifest" is used to refer to the structure of a node template or node instance that is independent of the state (i.e., independent of the stored therein). The node template state 518, the node template manifest 520, and the node template manifest state 522 all comprise the first unique node identifier 516. The node instance portion 504 comprises a node instance 524 which comprises a second unique node identifier 526 and a node instance state 528. The node instance portion 504 further comprises a node instance manifest 530 generated from the node instance 524 and a node instance manifest state 532 generated from the node instance manifest 530. The node instance state 528, node instance manifest 530, and the node instance manifest state 532 all comprise the second unique node identifier 526.

The executable node template portion 506 comprises an executable node template 534 which comprises an executable node template state 536. The executable node template portion 506 further comprises an executable node template manifest 538 generated from the executable node template 534 and an executable node template manifest state 540 generated from the executable node template manifest 538. The executable node template 534, the executable node template state 536, the executable node template manifest 538, and the executable node template manifest state 540 all comprise the first unique node identifier 516. The executable node template portion 506 is associated with zero or more overlay template portions such that the executable node template manifest 538 comprises zero or more overlay templates (e.g., the overlay template 550) and the executable node template manifest state 540 comprises zero or more unique node identifiers associated with zero or more overlay templates (e.g., the third unique node identifier 552).

The executable node instance portion 508 comprises an executable node instance 542 which comprises an executable node instance state 544. The executable node instance portion 508 further comprises an executable node instance manifest 546 generated from the executable node instance 542 and an executable node instance manifest state 548 generated from the executable node instance manifest 546. The executable node instance 542, the executable node instance state 544, the executable node instance manifest 546, and the executable node instance manifest state 548 all comprise the second unique node identifier 526. The executable node instance portion 508 is associated with zero or more overlay instance portions such that the executable node instance manifest 546 comprises zero or more overlay instances (e.g., the overlay instance 560) and the executable node instance manifest state 548 comprises zero or more unique node identifiers associated with zero or more overlay instances (e.g., the fourth unique node identifier 562).

The overlay template portion 510 comprises an overlay template 550 which comprises a third unique node identifier 552 and an overlay template state 554. The overlay template portion 510 further comprises a overlay template manifest 556 generated from the overlay template 550 and an overlay template manifest state 558 generated from the overlay template manifest 556. The overlay template state 554, the overlay template manifest 556, and the overlay template manifest state 558 all comprise the third unique node identifier 552. The overlay instance portion 512 comprises an overlay instance 560 which comprises a fourth unique node identifier 562 and an overlay instance state 564. The overlay instance portion 512 further comprises an overlay instance manifest 566 generated from the overlay instance 560 and an overlay instance manifest state 568 generated from the overlay instance manifest 566. The overlay instance state 564, the overlay instance manifest 566, and the overlay instance manifest state 568 all comprise the fourth unique node identifier 562.

In some embodiments, the executable node template portion 506 is associated with the overlay instance portion 512. That is, the executable node template manifest state 540 may comprise a reference to the fourth unique node identifier 562 of the overlay instance portion 512. Such a scenario occurs when an overlay instance is associated with a node template (e.g., as shown by the first run-time overlay 466 in FIGS. 4B, 4C, and 4D).

An executable run-time node is thus persisted to storage, and loaded from storage, by linking the node template portion 502 and the executable node template portion 506 to the same unique node identifier (i.e., the first unique node identifier 516) and by linking the node instance portion 504 and the executable node instance portion 508 to the same unique node identifier (i.e., the second unique node identifier 526). The executable node template may thus be persisted and loaded based on the first unique node identifier 516 and the executable node instance may be persisted and loaded based on the second unique node identifier 526. The executable node template portion 506 is associated with zero or more overlay template portions 510 and the executable node instance portion 508 is associated with zero or more overlay instance portions 512. Thus, when loading an executable node template or instance from storage, the associated overlay templates and/or instances are identified and loaded based on the unique node identifiers associated with the overlay templates and/or instances stored in the manifest states of the executable node template and/or instance.

The loading and storing of template-based executable graph-based models based on the decomposition shown in FIG. 5 is described in more detail below in relation to FIGS. 9 and 10. Beneficially, each component is stored separately thereby allowing a user to maintain and store their data independently of the storage of the structure and functionality of the executable graph-based model.

Having described the structure and function of template-based executable graph-based models in FIGS. 4A-4D, the definition and generation of an example template-based executable graph-based model will now be described to provide further understanding of the aspects described above.

Figure 6:
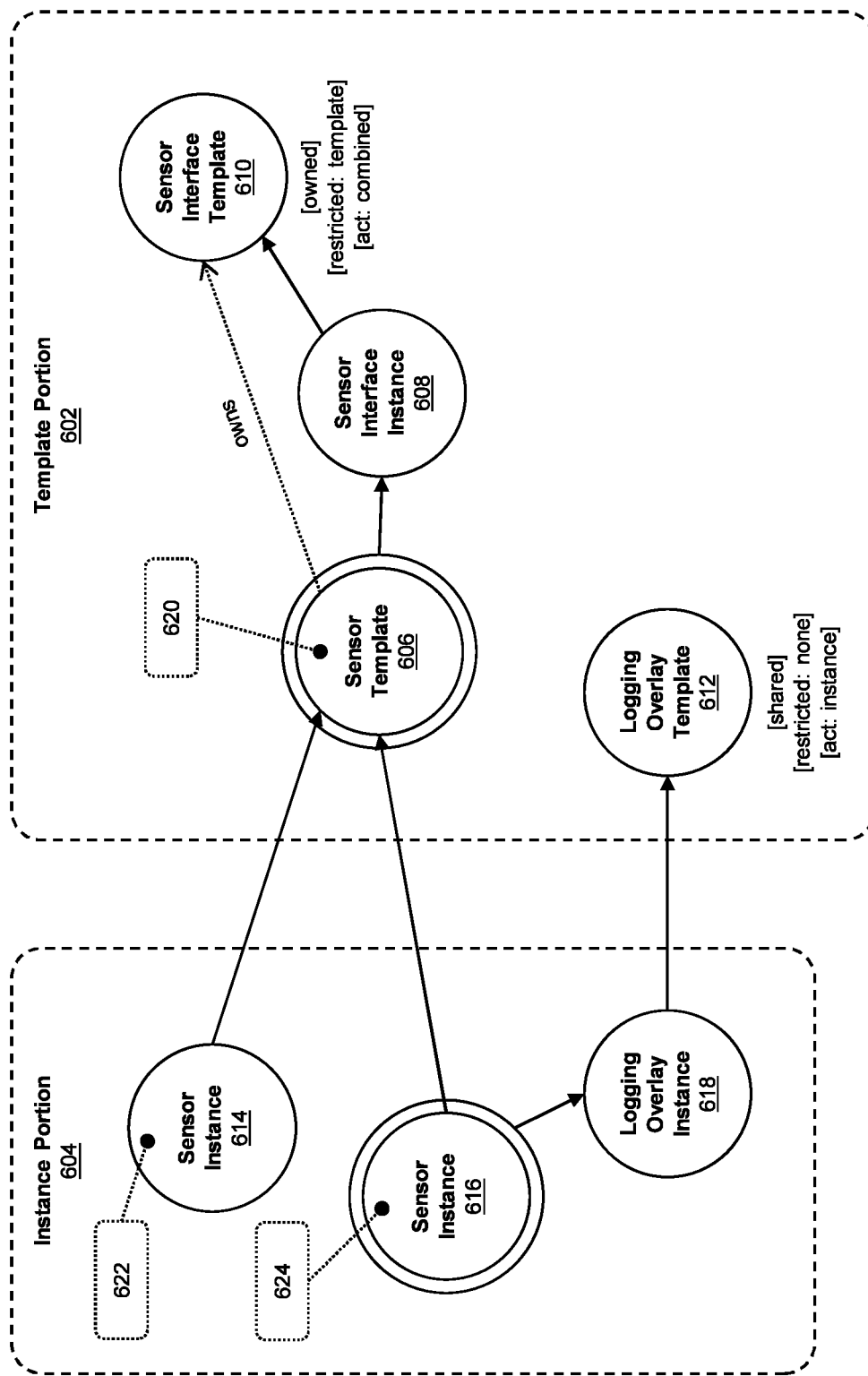
FIG. 6 shows a templated executable graph-based model of a part of a soil sensor system according to an embodiment of the present disclosure.

FIG. 6 shows a templated executable graph-based model of a part of a soil sensor system according to an embodiment of the present disclosure.

The templated executable graph-based model comprises a template portion 602 and an instance portion 604. The template portion 602 comprises a node template 606 which is associated with a first overlay instance 608. The first overlay instance 608 is a specific implementation of the first overlay template 610. The template portion 602 further comprises a second overlay template 612. The instance portion 604 comprises a first node instance 614 and a second node instance 616. Both the first node instance 614 and the second node instance 616 are specific implementations of the node template 606. The second node instance 616 is associated with a second overlay instance 618 which is an implementation of the second overlay template 612. The node template 606 comprises a set of attribute templates 620. The first node instance 614 comprises a set of attribute instances 622 associated with the set of attribute templates 620 of the node template 606. The second node instance 616 comprises a set of attribute instances 624 associated with the set of attribute templates 620 of the node template 606. The templated executable graph-based model shown in FIG. 6 corresponds to a portion of a soil moisture sensor system. More particularly, the templated executable graph-based model corresponds to the portion of the system related to the interface with physical soil moisture sensors. Templated executable graph-based models are well suited to such precision agriculture applications due to the reusability and extensibility of the template structure as well as the reduction in latency provided by the integration of data and data processing logic within a single model.

The node template 606 corresponds to a template for a soil moisture sensor; that is, the node template 606 comprises the common structure and data applicable to a specific type of soil moisture sensor (e.g., a specific model of soil moisture sensor). The first overlay template 610 and the first overlay instance 608 define processing logic operable to interface with a soil moisture sensor depending on configuration values assigned attributes defined in the node template 606. The first node instance 614 and the second node instance 616 correspond to specific implementations of the node template 606 and are associated with two physical soil moisture sensors placed within the real world. The two physical soil moisture sensors are of the specific type represented by the node template 606. The set of attribute instances 622 of the first node instance 614 define values related to the specific soil moisture sensor associated with the first node instance 614. For example, the set of attribute templates 620 may define attributes such as unique model number, internet protocol (IP) address, and global positioning system (GPS) location; the set of attribute instances 622 of the first node instance 614 may thus specify values for these attributes which are specific to the soil moisture sensor associated with the first node instance 614. Similarly, the set of attribute instances 624 of the second node instance 616 may assign values for the set of attribute templates 620 which are specific to the soil moisture sensor associated with the second node instance 616. In this way, the processing logic defined in the first overlay template 610 and/or the first overlay instance 608 is operable to interact with the requisite sensor by utilizing the values set in the set of attribute instances 622 or the set of attribute instances 624.

The second node instance 616 is associated with the second overlay instance 618 which corresponds to a specific implementation of the second overlay template 612. The second overlay template 612 defines common structures and data for performing data logging. As is known, such logging may be achieved in several ways and for several purposes therefore being well suited to having multiple possible implementations. The second overlay instance 618 is an implementation of the second overlay template 612 which contains processing logic operable to record logging data to a distributed ledger, or blockchain. Thus, various aspects of the processing performed by the second node instance 616 (e.g., values set, values obtained, etc.) may be logged by associating the second node instance 616 with the second overlay instance 618. As can be seen in FIG. 6, the first overlay template 610 is owned by the node template 606 and has configuration [owned, restricted: template, act: combined]. The second overlay template 612 is shared and has configuration [shared, restricted: none, act: instance].

An executable, run-time, version of the overlay structure shown in FIG. 6 is generated during execution of the templated executable graph-based model. More particularly, the node template 606 is obtained and a first run-time overlay is obtained (or generated if not already created). The first run-time overlay comprises a composition of the first overlay template 610 and the first overlay instance 608. The node template 606 and the first run-time overlay correspond to an executable template. One or more data elements relating to the first soil moisture sensor are received. The one or more data elements may comprise data such as the IP address, model number, etc. for the first soil moisture sensor. Using the node template 606 as an ontology, the one or more data elements are mapped to the node template 606 to generate the first node instance 614. As a result, the set of attribute instances 622 in the first node instance 614 contains the one or more data elements mapped to the ontology defined by the node template 606. The node template 606 and the first node instance 614 form a first run-time node which is an executable run-time node—i.e., a first executable run-time node-because the node template 606 is an executable node template. In consequence, the first run-time overlay (i.e., the composition of the first overlay template 610 and the first overlay instance 608) is registered in the overlay manager of the first executable run-time node. The first executable run-time node generated at run-time (i.e., during execution of the templated executable graph-based model) thus comprises a base node corresponding to the first executable run-time node (i.e., the node template 606 with the first run-time overlay associated therewith and the first node instance 614) and an overlay manager with a reference to the first run-time overlay registered.

A similar process is repeated for the second node instance 616 when one or more data elements associated with the second soil moisture sensor are received. This results in the generation of a second executable run-time node comprising a base node corresponding to the first executable run-time node (i.e., the node template 606 with the first run-time overlay associated therewith and the first node instance 614) and an overlay manager with a reference to the first run-time overlay registered. However, unlike the first node instance 614, the second node instance 616 is an executable node instance—i.e., the second node instance 616 is associated with the second overlay instance 618. As such, the second node instance 616 is generated by mapping the received data to the ontology defined by the node template 606 and then generating an executable node instance comprising the node instance generated by the mapping as the base node. A second run-time overlay comprising a composition of the second overlay template 612 and the second overlay instance 618 is then registered in the overlay manager of the executable node instance.

Once generated, the templated executable graph-based model may be used to read soil moisture measurements from the two sensors (either periodically or continuously). For example, a stimulus and associated context may be received by the second node instance 616. The stimulus and associated context relate to a request to obtain a soil moisture measurement from the soil moisture sensor associated with the second node instance 616. In response, and based on the associated context, the run-time overlays associated with the second node instance 616 are executed (i.e., the processing logic contained in the first overlay template 610, first overlay instance 608, second overlay template 612, and/or second overlay instance 618 are caused to be executed). This results in a log being recorded (by the second overlay instance 618) to indicate that a request to take a measurement has been made. The processing logic of the first overlay instance 608 is executed to obtain a soil moisture measurement from the soil moisture sensor (e.g., using the IP address defined in the attribute instance values of the second node instance 616 to communicate with the soil moisture sensor). Once the measurements have been obtained, they are output as outcomes.

The templated executable graph-based model shown in FIG. 6 includes a complex overlay structure and a complex node structure. The overlay and template structure comprise a complex structure which cannot be easily visualized in conjunction with other elements of the templated executable graph-based model without causing visual clutter or losing key contextual information (e.g., by hiding or occluding parts of the templated executable graph-based model to display various sub-structures).

Figure 7A:
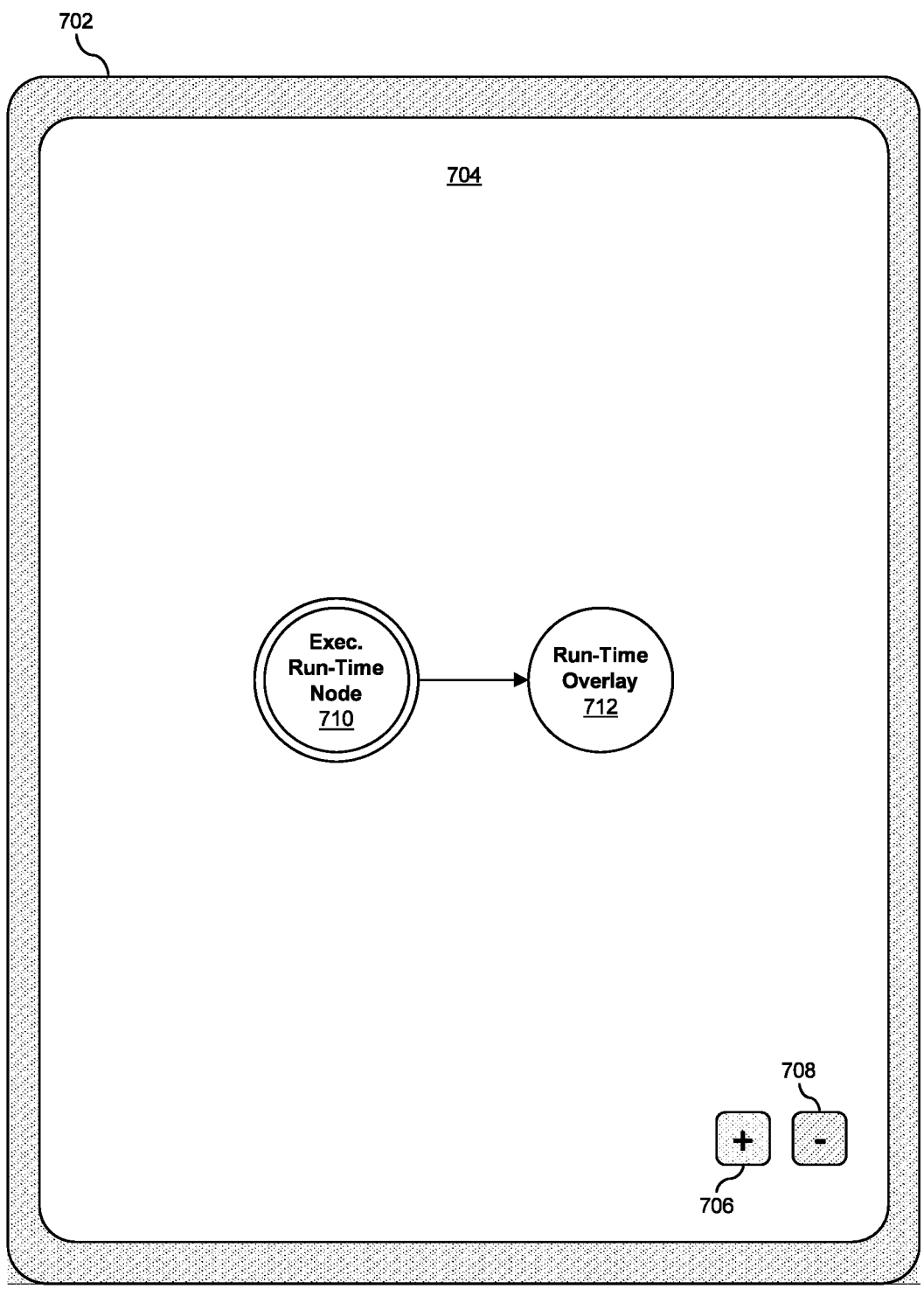
FIGS. 7A-7C illustrate the visualization of templated executable graph-based models according to an embodiment of the present disclosure.
Figure 7B:
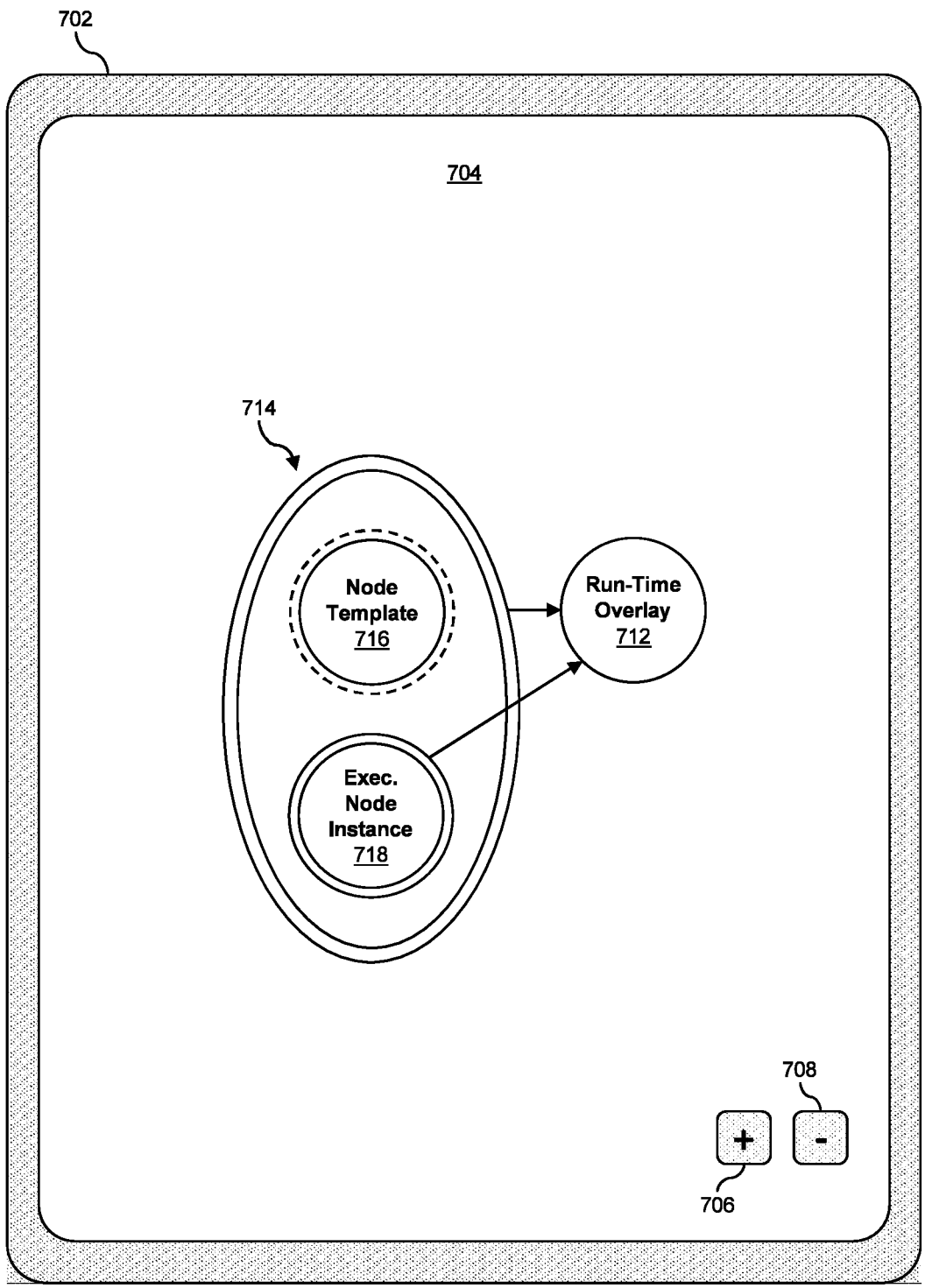
Figure 7C:
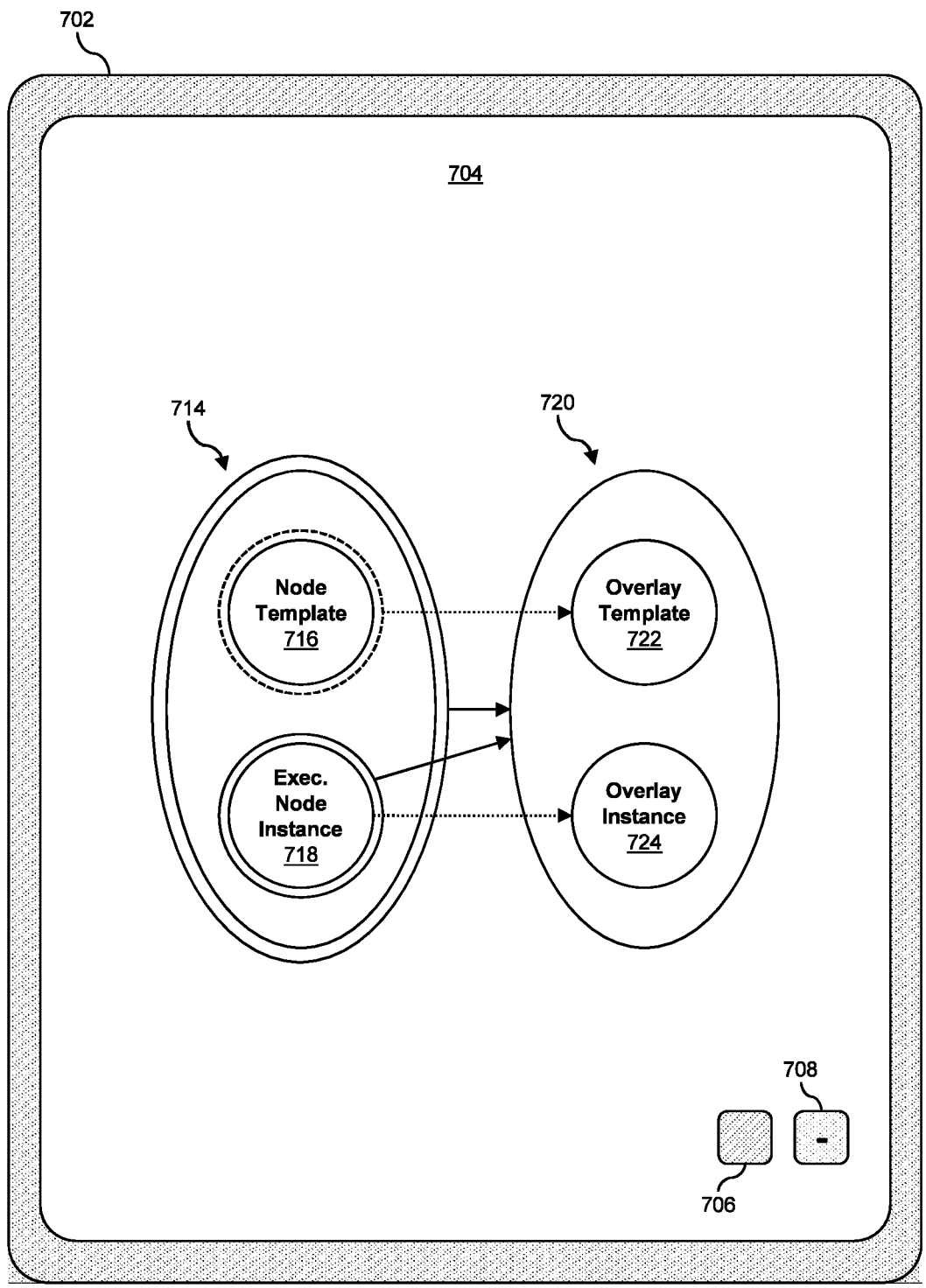

FIGS. 7A-7C illustrate the visualization of templated executable graph-based models according to an embodiment of the present disclosure.

FIG. 7A shows a device 702 upon which a user interface 704 is displayed. The user interface 704 comprises a first selector 706 and a second selector 708. A first graphical representation 710 associated with an executable run-time node is displayed within the user interface 704 along with a second graphical representation 712 associated with a run-time overlay.

The user interface 704 shown in FIG. 7A displays a template-based overlay structure at a first level of detail. The first selector 706 comprises a magnifying, or "zoom-in", selector. The first selector 706 is selectable by a user of the device 702 to increase the level of detail of the templated executable graph-based model shown within the user interface 704. Similarly, the second selector 708 comprises a demagnifying, or "zoom-out", selector which is selectable by a user of the device 702 to decrease the level of detail of the templated executable graph-based model shown within the user interface 704. Because the level of detail is already at the lowest level of detail, the level of detail cannot be decreased any further and so the second selector 708 within the user interface 704 is disabled (i.e., a user is not able to select the second selector 708).

The first graphical representation 710 and the second graphical representation 712 are visual representations of the template-based overlay structure of an executable run-time node and an associated run-time overlay. As described in more detail above in relation to FIGS. 4C and 4D, an executable run-time node comprises a complex arrangement of node templates, node instances, overlay templates, and overlay instances. Various configurations and relationships between the components of an executable run-time node are achievable but are not visually represented within the level of detail shown in FIG. 7A. That is, whilst the first graphical representation 710 and the second graphical representation 712 visually convey that the executable run-time node of the first graphical representation 710 is associated with the run-time overlay of the second graphical representation 712, the ownership, structure, and relationship of the run-time overlay to the node template and node instance of the executable run-time node is not displayed.

FIG. 7B shows the template-based overlay structure represented in FIG. 7A at a second, greater, level of detail.

FIG. 7B shows the user interface 704 displayed on the device 702 with the template-based overlay structure shown in FIG. 7A shown at an increased level of detail. The second graphical representation 712 associated with the run-time overlay is shown within the user interface 704 along with a third graphical representation 714 associated with the executable run-time node. The third graphical representation 714 comprises a fourth graphical representation 716 associated with a node template and a fifth graphical representation 718 associated with an executable node instance.

The user interface 704 shown in FIG. 7B is displayed as a result of a user selection of the first selector 706 in the user interface 704 shown in FIG. 7A. That is, the user interface 704 is shown in consequence of a user requesting that the level of detail of the user interface 704 shown in FIG. 7A be increased. The user interface 704 shown in FIG. 7B thus displays the template-based overlay structure at a second level of detail, which is greater than the first level of detail. Selection of the second selector 708 by a user decreases the level of detail and returns display to the user interface 704 shown in FIG. 7A.

The node template associated with the fourth graphical representation 716 and the executable node instance associated with the fifth graphical representation 718 correspond to the template portion and instance portion of the executable run-time node associated with the third graphical representation 714. Thus, by increasing the level of detail, the structure of the executable run-time node and its relationship to the run-time overlay may be visualized. As can be seen in FIG. 7B, the increase in detail is provided whilst maintaining the overall structure, or topology, of the template-based overlay structure. That is, in transitioning from the first level of detail (FIG. 7A) to the second level of detail (FIG. 7B), the first graphical representation 710 of the executable run-time node is replaced with the third graphical representation 714 whilst maintaining display of the second graphical representation 712—i.e., whilst maintaining display of the graphical representation associated with the run-time overlay and its relationships and associations with the executable run-time node. This allows a user to navigate the different levels of detail of a complex template-based overlay structure whilst maintaining the overall context (or topology) of the structure at the different levels of detail.

The example shown in FIG. 7B corresponds to an increase in the level of detail from the example shown in FIG. 7A for the scenario whereby the run-time overlay is owned by the node instance of the executable run-time node and is instance specific (i.e., the run-time overlay is generated for the node instance). This scenario is described in more detail above in relation to FIG. 4D. However, in other scenarios, an overlay instance may be owned by a node template with which the overlay template is associated. Alternatively, the node instance associated with the fifth graphical representation 718 may be an executable node which is associated to an owned or shared overlay template with associated overlay instance (forming a run-time overlay). Alternatively, both the node template and node instance may be associated with one or more run-time overlays in the same visual representation based on the level of detail chosen. Alternatively, the visual representation may be chosen so as to illustrate only the template or instance portions of the executable graph (not shown).

FIG. 7C shows the template-based overlay structure shown in FIG. 7B at a third, greater, level of detail.

FIG. 7C shows the user interface 704 displayed on the device 702 with the template-based overlay structure shown in FIG. 7B at an increased level of detail. A sixth graphical representation 720 associated with the run-time overlay is shown along with the third graphical representation 714, the fourth graphical representation 716, and the fifth graphical representation 718 (all associated with the executable run-time node). The sixth graphical representation 720 comprises a seventh graphical representation 722 associated with the overlay template of the run-time overlay and an eighth graphical representation 724 associated with the overlay instance of the run-time overlay.

The user interface 704 shown in FIG. 7C is displayed as a result of a user selection of the first selector 706 in the user interface 704 shown in FIG. 7B. That is, the user interface 704 is shown in consequence of a user requesting that the level of detail of the user interface 704 shown in FIG. 7B being increased. The user interface 704 shown in FIG. 7C thus displays the template-based overlay structure at a third level of detail, which is greater than the second level of detail. Selection of the second selector 708 by a user decreases the level of detail and returns display to the user interface 704 shown in FIG. 7B. Because the template-based overlay structure is displayed in the user interface 704 of FIG. 7C at the highest level of detail, the level of detail cannot be increased any further and so the first selector 706 is disabled (i.e., the first selector 706 cannot be selected by a user).

The overlay template associated with the seventh graphical representation 722 and the overlay instance associated with the eighth graphical representation 724 correspond to the overlay template and the overlay instance of the run-time overlay associated with the sixth graphical representation 720. The sixth graphical representation 720 thus corresponds to an increased visualization of the run-time overlay associated with the second graphical representation 712 shown in FIGS. 7A and 7B. Therefore, by increasing the level of detail, the template and instance portions of the executable run-time node, and their relationship to the template and instance portions of the run-time overlay, may be visualized.

The fourth graphical representation 716 is displayed with a dashed outer circle indicating that the node template owns an overlay template (but not a corresponding overlay instance). The ownership relationship is revealed in FIG. 7C and is indicated by the dashed line connecting the dashed outer circle surrounding the fourth graphical representation 716 and the seventh graphical representation 722 (i.e., the node template associated with the fourth graphical representation 716 is shown to own the overlay template associated with the seventh graphical representation 722). The fifth graphical representation 718 is displayed with a solid outer circle indicating that the node instance is an executable node instance because it is associated with the overlay instance associated with the eighth graphical representation 724. As can be seen in FIG. 7C, the increase in detail is provided whilst maintaining the overall structure, or topology, of the template-based overlay structure. That is, in transitioning from the second level of detail (FIG. 7B) to the third level of detail (FIG. 7C), the second graphical representation 712 of the run-time overlay is replaced with the sixth graphical representation 720 whilst maintaining display of the relationships between the executable run-time node and the run-time overlay.

The description will now turn to methods which operate in conjunction with the systems and functionality described above.

Figure 8:
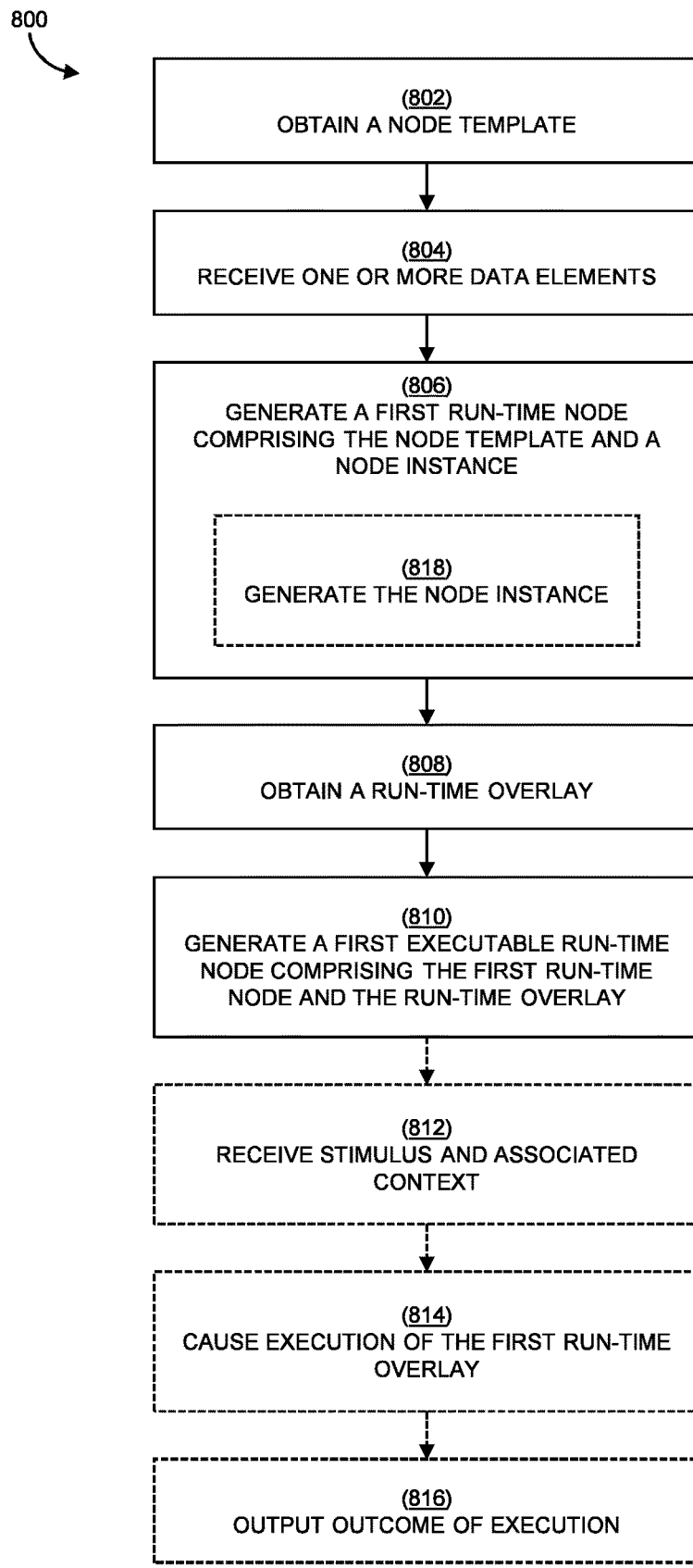
FIG. 8 shows a method for template-driven generation of run-time executable graph-based models according to an aspect of the present disclosure.

FIG. 8 shows a method 800 for template-driven generation of run-time executable graph-based models according to an aspect of the present disclosure.

The method 800 comprises the steps of obtaining 802 a node template, receiving 804 one or more data elements, generating 806 a first run-time node comprising the node template and a node instance, obtaining 808 a run-time overlay, and generating 810 a first executable run-time node comprising the first run-time node and the run-time overlay. The method 800 optionally comprises the steps of receiving 812 a stimulus and an associated context, causing 814 execution of the first run-time overlay, and outputting 816 the outcome of the execution. The step of generating 806 the first run-time node optionally comprises the step of generating 818 the node instance. In one embodiment, the method 800 is performed by a system such as the system 300 described above in relation to FIG. 3.

At the step of obtaining 802, a node template is obtained (e.g., the node template 404 shown in FIG. 4A). The node template comprises a predetermined node structure and one or more rules governing generation of node instances based on the node template.

The node template defines all the structural and behavioral aspects of an ontology. That is, the node template defines what is allowed for a node instance when generated as part of an executable graph-based model. Here, the node structure may be understood as the various elements, properties, and configurations defined by the node template (as described in more detail in relation to FIG. 4A above). The one or more rules may be understood as referring to the configuration settings which are used by a node template when generating a node instance (e.g., identifier generation, or version numbering) and/or the rules governing the assignment of instance values to attribute templates defined in the node template. For example, ensuring that instance values assigned to an attribute template having a type of string are themselves strings (and not integers, floats, etc.). As a further example, the one or more rules may include rules governing the range of possible values that may be assigned to an attribute template such as limiting the instance values to be positive values, strings of a certain length, values which match a predetermined pattern, or the like.

The node template may be read only, such that the data and structure defined by the node template is accessible to a corresponding node instance but not editable. The node template may comprise an attribute template. The attribute template comprises a name and a value type for a corresponding attribute. As described below, the value for the corresponding attribute may be assigned or set by an associated node instance (e.g., during generation of the node instance). The node template may define a default value for the attribute template. The default value corresponds to the value assigned to the attribute template if no value is expressly assigned by the node instance.

At the step of receiving 804, one or more data elements are received.

In one embodiment, the one or more data elements are received in response to a stimulus being received. That is, the method 800 may comprise, prior to the step of receiving 804, the step of receiving (not shown) a stimulus and context associated with the stimulus, where the step of receiving 804 the one or more data elements occurs in response to the stimulus being received. The one or more data elements may be received based on the first context.

The one or more data elements correspond to data elements which are used to generate a node instance based on the node template. For example, if the node template represents a person and requires values for the attribute templates of surname and first name to be set; then the one or more data elements may comprise instance values for these attribute templates. The one or more data elements may be received from other components of a template-based executable graph-based model containing the node template (e.g., from other nodes or overlays), from other components within a system executing the template-based executable graph-based model (e.g., the system 300 described in relation to FIG. 3 above), or from one or more external sources.

At the step of generating 806, a first run-time node is generated in response to the one or more data elements being received. The first run-time node comprises the node template and a first node instance. The first node instance comprises the one or more data elements mapped to the node template based on the one or more rules of the node template. An example run-time node is shown in FIG. 4A and described above.

In one embodiment, the step of generating 806 comprises the step of generating 818 the first node instance. At the step of generating 818, the first node instance is generated by mapping the one or more data elements to the node template based on the one or more rules of the node template. Continuing the previous example, the one or more data elements may contain the values "Bell-Richards" and "Douglas" which are mapped to the attribute templates based on rules which ensure that the values are of type string. This results in a node instance being generated having attribute instances for the attribute templates of surname and first name (defined in the node template) corresponding to "Bell-Richards" and "Douglas". As such, as part of generating the first run-time node, one or more instance values for attribute templates may be assigned and stored in the first node instance. The one or more instance values may be based on one or more of the one or more data elements received at the step of receiving 804.

At the step of obtaining 808, a first run-time overlay is obtained. The first run-time overlay comprises an overlay template and a first overlay instance comprising processing logic implementing at least one generic rule of the overlay template.

As stated in relation to FIGS. 4A-4D above, the run-time overlay may be obtained or generated in several ways. In general, the run-time overlay may be obtained by obtaining the overlay template and the first overlay instance, and then associating the overlay template and the first overlay instance to generate the run-time overlay. More particularly, and as described in more detail in relation to FIGS. 9A-9D and 10, the first overlay instance is first obtained because the first overlay instance comprises a reference to the first overlay template thereby allowing the first overlay template to be obtained and the run-time overlay to be generated. The node template may be an executable node template such that both the overlay template and the overlay instance are associated with the node template (and thus referenced in the manifest of the executable node template). Alternatively, the overlay template may be associated with the node template, but the overlay instance is associated with the node instance. That is, the overlay instance provides its own unique implementation of the overlay template. In addition, the overlay template may be shared by the first run-time overlay and a second run-time overlay. Access to the overlay template is restricted to read only access such that the overlay instance may access the data and/or structures of the overlay template but may not modify the overlay template in any way.

At the step of generating 810, a first executable run-time node is generated. The first executable run-time node comprises a composition of the first run-time node and the first run-time overlay such that the processing logic of the first run-time overlay is operable to interact with the first run time node during execution of the first executable run-time node. Example structures of executable run-time nodes are shown in FIGS. 4C and 4D.

One or more of the above steps may be repeated to generate one or more other run-time nodes within the executable graph-based model. For example, a second run-time node may be obtained. The second run-time node comprises the node template obtained at the step of obtaining 802 and a second node instance generated based on the one or more rules of the node template. A second executable run-time node may then be generated. The second executable run-time node comprises a composition of the second node instance the first run-time overlay such that the processing logic of the first run-time overlay is operable to interact with the second run-time node during execution of the second executable run-time node.

At the optional step of receiving 812, a stimulus and a context associated with stimulus are received.

Stimuli provide the basis for all interactions within an executable graph-based model. The first stimulus has a type such as a command (e.g., a transactional request), a query, or an event from an internal or external system. The first stimulus is either externally or internally generated (triggered). For example, the first stimulus may be associated with an event related to an external device which is then received by the template-based executable graph-based model. Alternatively, the first stimulus may have been generated by processing logic within the template-based executable graph-based model.

At the optional step of causing 814, an execution of the processing logic of the first run-time overlay of the first executable run-time node is caused in response to the second stimulus being received.

In an embodiment, execution of the processing logic of the first overlay node is based on the context received with the stimulus. For example, the context comprises information necessary for the processing logic to be executed.

The first executable run-time node comprises a state. The execution of the processing logic caused at the causing 814 step, may cause a change in the state of the first executable run-time node, or a component node thereof (e.g., the first run-time node or the first node instance). For example, the execution of the processing logic may cause an instance value to be set. In a further example, execution of the processing logic may cause a new attribute to be generated and may also set an instance value for the new attribute. The execution can also leave the state of the first executable run-time node unchanged. For example, the execution of the processing logic can cause an instance value of an attribute instance to be output.

As stated previously, processing within the executable graph-based model is driven by stimuli. Consequently, execution of the processing logic caused by the causing 814 step may cause a second stimulus to be generated (fired). For example, a second stimulus associated with a second node within the executable graph-based model is fired and subsequently received by a second overlay node. In consequence of the second stimulus being received, processing logic of the second overlay node is executed.

At the optional step of outputting 816, one or more outcomes of the execution caused at the step of causing 814 are output. In one embodiment, the one or more outcomes of the execution are obtained prior to the step of outputting 816. The one or more outcomes may be output to a run-time overlay within the templated executable graph-based model, a unit within the system which manages the templated executable graph-based model (e.g., the system 300 shown in FIG. 3), or output to one or more systems or devices external to the system (e.g., via the interface module 304 of the system 300).

Figure 9A:
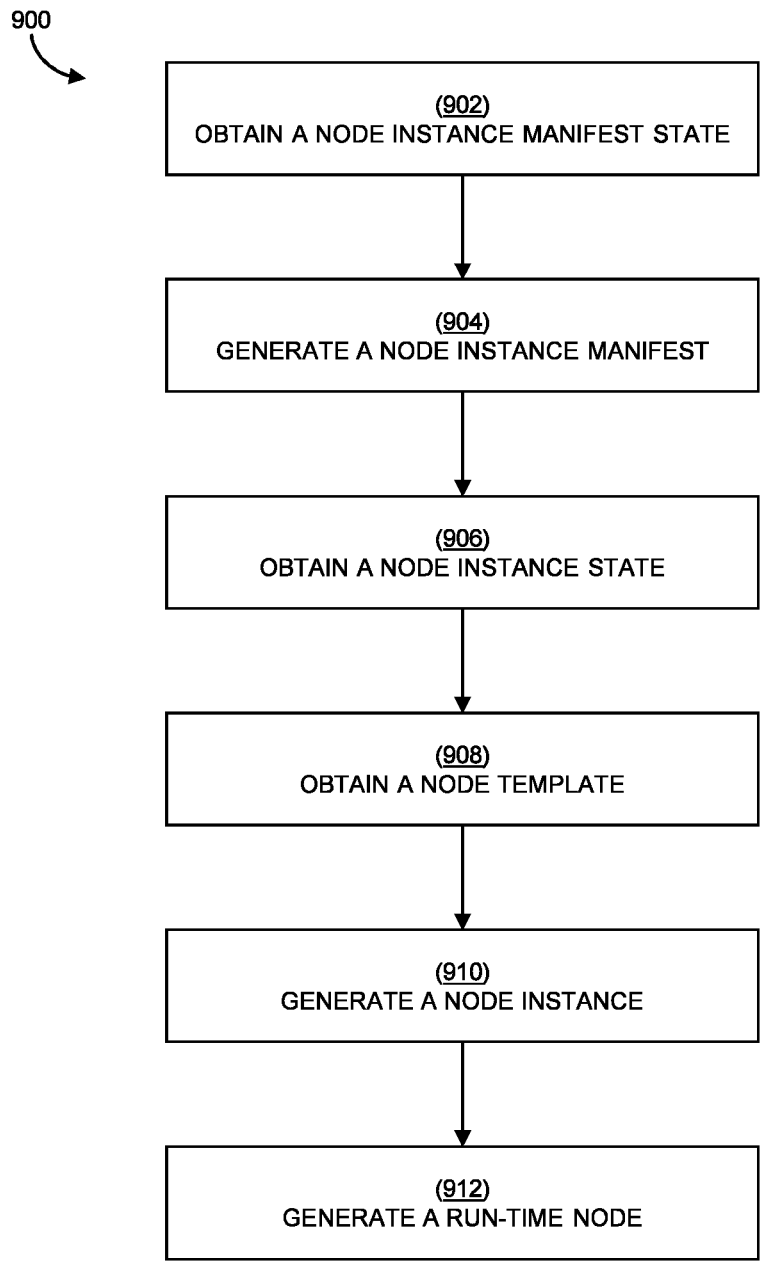
FIG. 9A shows a method for loading run-time nodes of a template-based executable graph-based models according to an aspect of the present disclosure.

FIG. 9A shows a method 900 for loading run-time nodes of a template-based executable graph-based models according to an aspect of the present disclosure.

The method 900 comprises obtaining 902 a node instance manifest state, generating 904 a node instance manifest, obtaining 906 a node instance state, obtaining 908 a node template, generating 910 a node instance, and generating 912 a run-time node. In one embodiment, the method 900 is performed by a system such as the system 300 described above in relation to FIG. 3.

At the step of obtaining 902, a node instance manifest state is obtained based on a first unique node identifier associated with a node instance (e.g., the node instance manifest state 532 shown in FIG. 5 is obtained based on the second unique node identifier 526 associated with the node instance 524). The node instance manifest state comprises a second unique node identifier associated with a node template (e.g., the node instance manifest state 532 shown in FIG. 5 comprises the first unique node identifier 516 associated with the node template 514).

At the step of generating 904, a node instance manifest is generated from the node instance manifest state (e.g., the node instance manifest 530 shown in FIG. 5 is generated from the node instance manifest state 532). The node instance manifest comprises a first storage location and the first unique node identifier (e.g., the second unique node identifier 526 shown in FIG. 5).

At the step of obtaining 906, a node instance state is obtained from the first storage location (e.g., the node instance state 528 shown in FIG. 5). Here, the first storage location corresponds to a file path or location (e.g., URL) at which the node instance state is stored.

At the step of obtaining 908, the node template is obtained based on the second unique node identifier associated with the node template (e.g., the node template 514 shown in FIG. 5 is obtained based on the first unique node identifier 516).

At the step of generating 910, the node instance is generated from the node instance manifest, the node instance state, and the node template (e.g., the node instance 524 shown in FIG. 5 is generated from the node instance manifest 530, the node instance state 528, and the node template 514).

At the step of generating 912, a run-time node is generated. The run-time node comprises a composition of the node instance and the node template (e.g., the node instance 524 and the node template 514 shown in FIG. 5 are composed to form a run-time node).

Figure 9B:
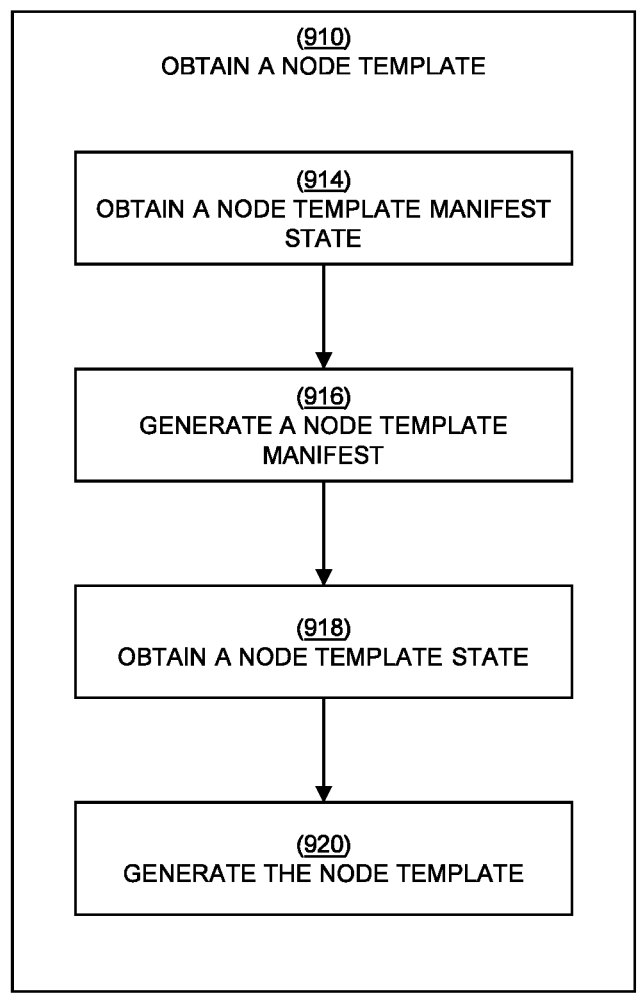
FIG. 9B shows the steps performed as part of the step of obtaining a node instance in the method of FIG. 9A according to an embodiment of the present disclosure.

FIG. 9B shows the steps performed as part of the step of generating 910 a node template in the method 900 according to an embodiment of the present disclosure.

FIG. 9B shows the steps of obtaining 914 a node template manifest state, generating 916 a node template manifest, obtaining 918 a node template state, and generating 920 the node template.

At the step of obtaining 914, a node template manifest state is obtained based on the second unique node identifier associated with the node template (e.g., the node template manifest state 522 shown in FIG. 5 is obtained based on the first unique node identifier 516 associated with the node template 514).

At the step of generating 916, a node template manifest is generated from the node template manifest state (e.g., the node template manifest 520 shown in FIG. 5 is generated from the node template manifest state 522). The node template manifest comprises a second storage location and the second unique node identifier (e.g., the first unique node identifier 516 shown in FIG. 5).

At the step of obtaining 918, a node template state is obtained from the second storage location (e.g., the node template state 518 shown in FIG. 5). Here, the second storage location corresponds to a file path or location (e.g., URL) at which the node template state is stored.

At the step of generating 920, the node template is generated from the node template manifest and the node template state (e.g., the node template 514 shown in FIG. 5 is generated from the node template manifest 520 and the node template state 518).

Figure 9C:
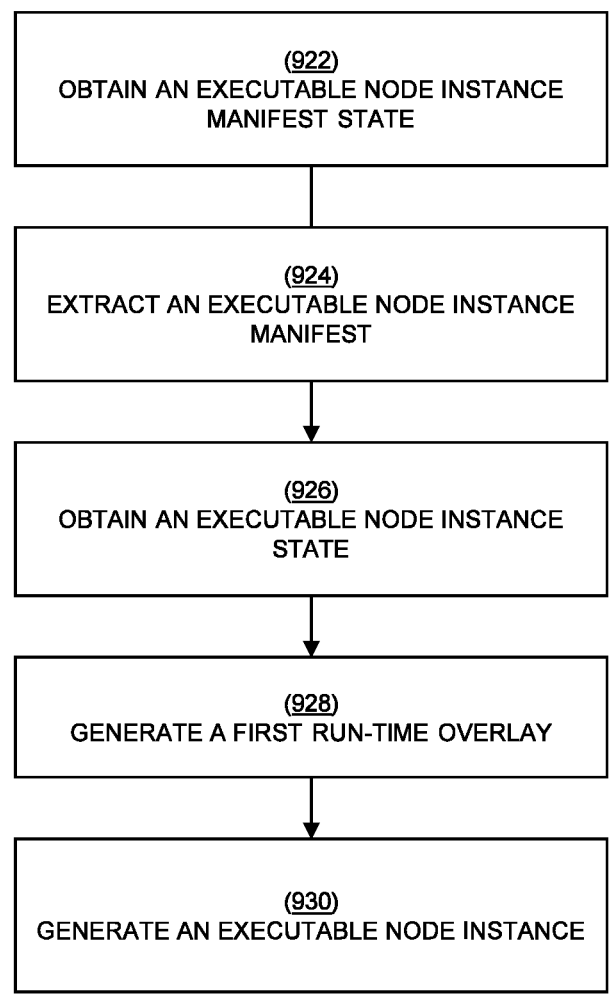
FIG. 9C shows steps which may be performed as part of the method shown in FIG. 9A to generate an executable node instance according to an embodiment of the present disclosure.

FIG. 9C shows steps which may be performed as part of the method 900 shown in FIG. 9A to generate an executable node instance according to an embodiment of the present disclosure.

FIG. 9C shows the steps of obtaining 922 an executable node instance manifest state, generating 924 an executable node instance manifest, obtaining 926 an executable node instance state, obtaining 928 a first run-time overlay, and generating 930 an executable node instance.

At the step of obtaining 922, an executable node instance manifest state is obtained based on the first unique node identifier associated with the node instance (e.g., the executable node instance manifest state 548 shown in FIG. 5 is obtained based on the second unique node identifier 526 associated with the node instance 524). The executable node instance manifest state comprises the first unique node identifier and a third unique node identifier associated with a first overlay instance (e.g., the second unique node identifier 526 and the fourth unique node identifier 562 shown in FIG. 5).

At the step of generating 924, an executable node instance manifest is generated from the executable node instance manifest state (e.g., the executable node instance manifest 546 shown in FIG. 5 is generated from the executable node instance manifest state 548). The executable node instance manifest comprises a third storage location and the first unique node identifier (e.g., the second unique node identifier 526 shown in FIG. 5).

At the step of obtaining 926, an executable node instance state is obtained from the third storage location (e.g., the executable node instance state 544 shown in FIG. 5). Here, the third storage location corresponds to a file path or location (e.g., URL) at which the executable node instance state is stored.

At the step of obtaining 928, a first run-time overlay is obtained based on the third unique node identifier (e.g., the fourth unique node identifier 562 shown in FIG. 5). The first run-time overlay comprises the third unique node identifier, the first overlay instance, and a first overlay template associated with the first overlay instance (e.g., a run-time overlay comprising the fourth unique node identifier 562 shown in FIG. 5, the overlay instance 560, and the overlay template 550).

In one embodiment, the first run-time overlay is generated as part of the operations performed at the step of obtaining 928. That is, the third unique node identifier is included within the manifest state of the executable node instance and is used to identify a manifest state associated with an overlay instance (e.g., the executable node instance manifest state 548 shown in FIG. 5 includes the fourth unique node identifier 562 which is used to identify the overlay instance manifest state 568 of the overlay instance 560). The manifest state of the overlay instance also comprises a fourth unique node identifier associated with an overlay template from which the overlay instance is generated (e.g., the overlay instance manifest state 568 shown in FIG. 5 comprises the third unique node identifier 552 associated with the overlay template 550). The fourth unique node identifier can then be used to identify a manifest state for the overlay template (e.g., the overlay template manifest state 558 shown in FIG. 5). The overlay template may then be generated from manifest state and the overlay instance generated from the overlay template and the manifest state of the overlay instance (e.g., the overlay instance 560 shown in FIG. 5 is generated from the overlay template 550 and the overlay instance manifest state 568). The run-time overlay may then be generated from the overlay template and the overlay instance.

At the step of generating 930, an executable node instance is generated based on the node instance, executable node instance manifest, the executable node instance state, and the first run-time overlay (e.g., the executable node instance 542 shown in FIG. 5 is generated based on the node instance 524, the executable node instance manifest 546, the executable node instance state 544, and a run-time overlay comprising a composition of the overlay template 550 and the overlay instance 560). The node instance is thus the base node instance of the executable node instance (e.g., the base node instance 472 of the executable node instance 460 shown in FIG. 4B). In the present embodiment, the run-time node generated at the step of generating 912 is generated using the executable node instance such that the composition of the run-time node comprises the executable node instance and the node template.

Figure 9D:
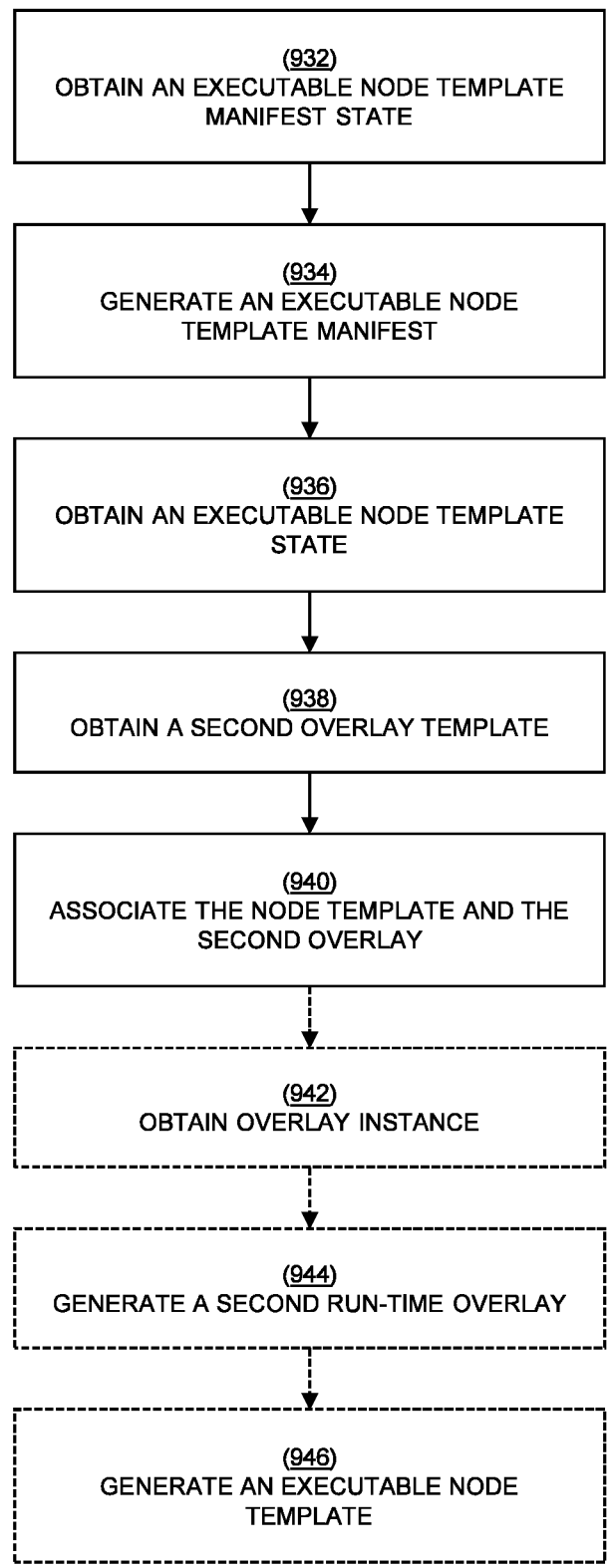
FIG. 9D shows steps which may be performed as part of the method shown in FIG. 9A to generate an executable node template according to an embodiment of the present disclosure.

FIG. 9D shows steps which may be performed as part of the method 900 shown in FIG. 9A to generate an executable node template according to an embodiment of the present disclosure.

FIG. 9D shows the steps of obtaining 932 an executable node template manifest state, generating 934 an executable node template manifest, obtaining 936 an executable node template state, obtaining 938 a second overlay template, and associating 940 the node template and the second overlay. FIG. 9D further shows the optional steps of obtaining 942 an overlay instances, generating 944 a second run-time overlay, and generating 946 an executable node template.

At the step of obtaining 932, an executable node template manifest state is obtained based on the second unique node identifier associated with the node template (e.g., the executable node template manifest state 540 shown in FIG. 5 is obtained based on the first unique node identifier 516 associated with the node template 514). The executable node template manifest state comprises the second unique node identifier and a third unique node identifier associated with a second overlay template (e.g., the first unique node identifier 516 and the third unique node identifier 552 shown in FIG. 5).

At the step of generating 934, an executable node template manifest is generated from the executable node template manifest state (e.g., the executable node template manifest 538 shown in FIG. 5 is generated from the executable node template manifest state 540). The executable node template manifest comprises a fourth storage location and the second unique node identifier (e.g., the first unique node identifier 516).

At the step of obtaining 936, an executable node template state is obtained from the fourth storage location (e.g., the executable node template state 536 shown in FIG. 5). Here, the fourth storage location corresponds to a file path or location (e.g., URL) at which the executable node template state is stored.

At the step of obtaining 938, the second overlay template is obtained based on the third unique node identifier (e.g., the overlay template 550 shown in FIG. 5 is obtained based on the third unique node identifier 552).

At the step of associating 940, the node template is associated with the second overlay template (e.g., the overlay template 550 shown in FIG. 5).

At the optional step of obtaining 942, a second overlay instance is obtained based on a fourth unique node identifier (e.g., the overlay instance 560 shown in FIG. 5 is obtained based on the fourth unique node identifier 562). The executable node template manifest comprises the fourth unique node identifier (e.g., the executable node template manifest 538 shown in FIG. 5 comprises the fourth unique node identifier 562).

At the optional step of generating 944, a second run-time overlay is generated. The second run-time overlay comprises a composition of the second overlay template and the second overlay instance (e.g., a composition of the overlay template 550 shown in FIG. 5

At the optional step of generating 946, an executable node template is generated based on the node template, the executable node template manifest, the executable node template state, and the second run-time overlay (e.g., the executable node template 534 shown in FIG. 5 is generated based on the node template 514, the executable node template manifest 538, the executable node template state 536, and a run-time overlay comprising a composition of the overlay template 550 and the overlay instance 560). The node template is thus the base node template of the executable node template (e.g., the base node template 462 of the executable node template 458 shown in FIG. 4B). In the present embodiment, the run-time node generated at the step of generating 912 is generated using the executable node template such that the composition of the run-time node comprises the node instance and the executable node template.

Figure 10A:
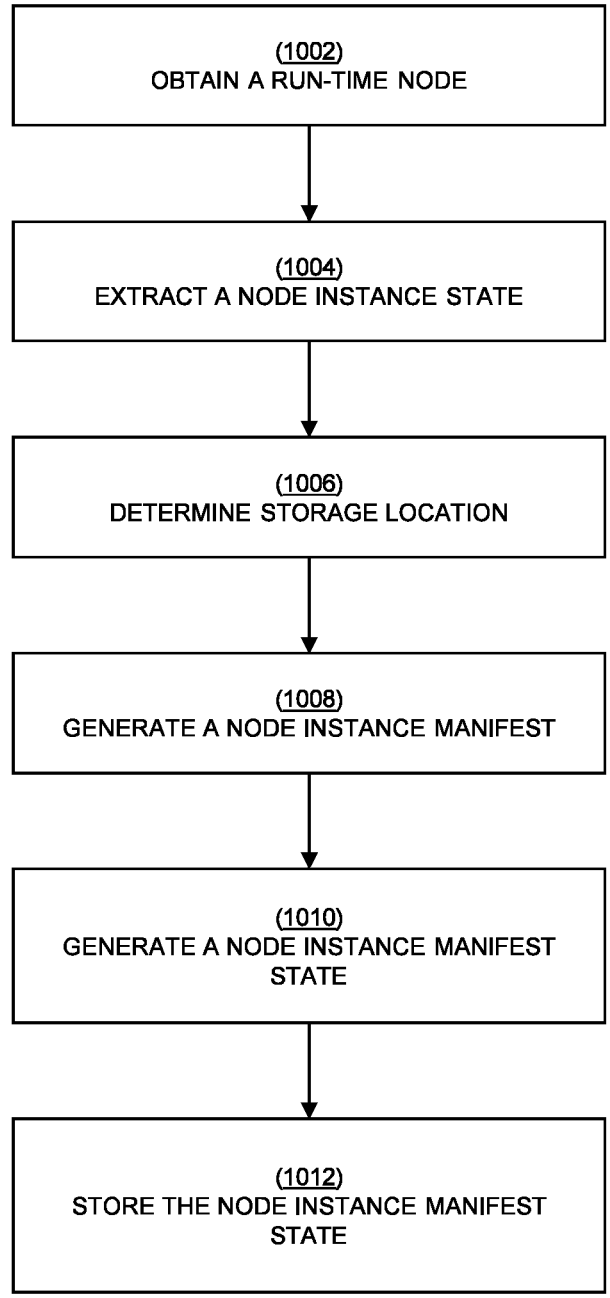
FIG. 10A shows a method for storage management of run-time nodes of a template-based executable graph-based model according to an aspect of the present disclosure.

FIG. 10A shows a method 1000 for storage management of run-time nodes of a template-based executable graph-based model according to an aspect of the present disclosure.

The method 1000 comprises the steps of obtaining 1002 a run-time node, extracting 1004 a node instance state, determining 1006 a storage location, generating 1008 a node instance manifest, generating 1010 a node instance manifest state, and storing 1012 the node instance manifest state.

At the step of obtaining 1002, a run-time node is obtained. The run-time node comprises a node template and a node instance generating according to the node template (e.g., the node template 514 and the node instance 524 shown in FIG. 5). The node template is associated with a first unique node identifier and the node instance is associated with a second unique node identifier (e.g., the first unique node identifier 516 and the second unique node identifier 526 shown in FIG. 5).

At the step of extracting 1004, a node instance state is extracted from the node instance (e.g., the node instance state 528 shown in FIG. 5 is extracted from the node instance 524). The node instance state comprises the first unique node identifier and the second unique node identifier (e.g., the first unique node identifier 516 and the second unique node identifier 526 shown in FIG. 5).

At the step of determining 1006, a storage location is determined for the node instance state (e.g., the node instance state 528 shown in FIG. 5). Here, determining a storage location corresponds to identifying or determining the file path, or location (e.g., URL), at which the node instance state will be, or has been, saved.

At the step of generating 1008, a node instance manifest associated with the node instance is generated (e.g., the node instance manifest 530 shown in FIG. 5). The node instance manifest comprises the first unique node identifier, the second unique node identifier, and the storage location for the node instance state (e.g., the node instance manifest 530 shown in FIG. 5 comprises the first unique node identifier 516 and the second unique node identifier 526).

At the step of generating 1010, a node instance manifest state is generated for the node instance manifest (e.g., the node instance manifest state 532 shown in FIG. 5). The node instance manifest state comprises the first unique node identifier and the second unique node identifier (e.g., the first unique node identifier 516 and the second unique node identifier 526 shown in FIG. 5).

At the step of storing 1012, the node instance manifest state is stored (e.g., the node instance manifest state 532 shown in FIG. 5).

Because a node template is required for a node instance to be generated at run-time, the skilled person will appreciate that the node template referred to at the step of obtaining 1002 is already persisted to storage and so does not need to be stored as part of the method 1000. That is, the node template manifest state associated with the node template is stored prior to the execution of the method 1000.

The node template manifest state may be stored at a first device and the node instance manifest state may be stored at a second device, where the second device being different to the first device. For example, the first device could be an enterprise facility managed by a company offering a service involving the template-based executable graph-based model within which the run-time node is contained, and the second device could be a device of a user of the template-based executable graph-based model. As such, the user is able to maintain their personal data separately from, and independently to, the enterprise facility managed by the company.

Optionally, the method 1000 further comprises storing the node instance state at the storage location (e.g., the node instance state 528 shown in FIG. 5).

Figure 10B:
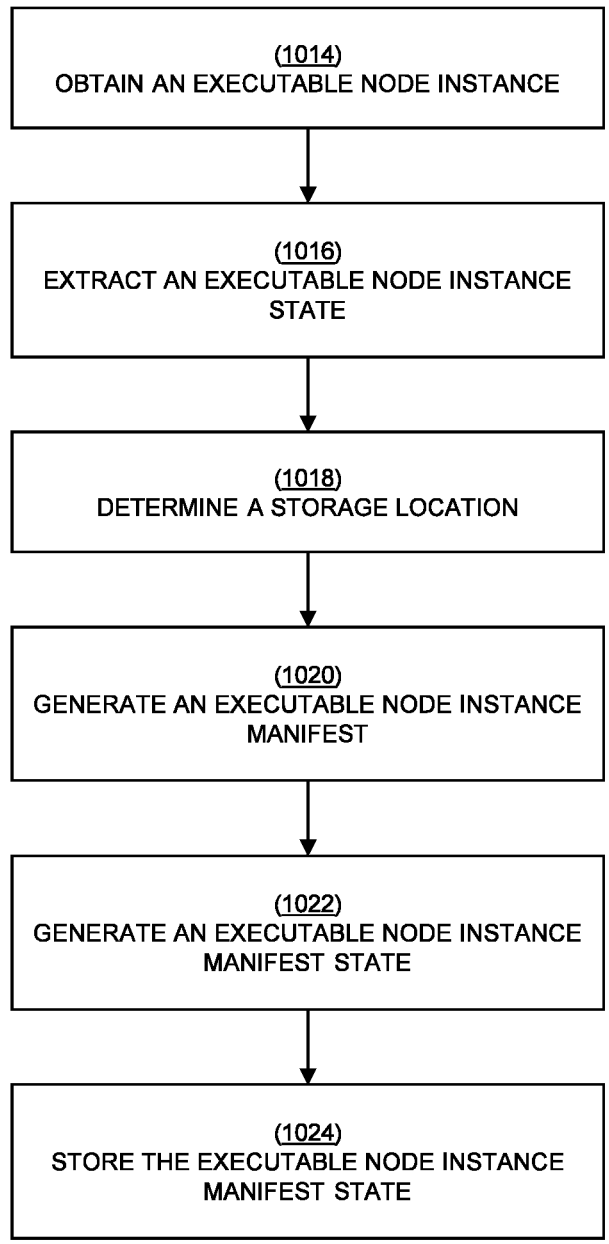
FIG. 10B shows steps which may be performed in conjunction with the method of FIG. 10A to store an executable node instance according to an embodiment of the present disclosure.

FIG. 10B shows steps which may be performed in conjunction with the method 1000 to store an executable node instance according to an embodiment of the present disclosure.

FIG. 10B shows the steps of obtaining 1014 an executable node instance, extracting 1016 an executable node instance state, determining 1018 a storage location, generating 1020 an executable node instance manifest, generating 1022 an executable node instance manifest state, and storing 1024 the executable node instance manifest state.

At the step of obtaining 1014, an executable node instance is obtained (e.g., the executable node instance 542 shown in FIG. 5). The executable node instance comprises the node instance (e.g., the node instance 524 shown in FIG. 5) and a first run-time overlay having an overlay instance comprising a third unique node identifier (e.g., the overlay instance 560 comprising the fourth unique node identifier 562 shown in FIG. 5).

At the step of extracting 1016, an executable node instance state is extracted from the executable node instance (e.g., the executable node instance state 544 shown in FIG. 5 is extracted from the executable node instance 542).

At the step of determining 1018, a storage location is determined for the executable node instance state (e.g., the executable node instance state 544 shown in FIG. 5). Here, the storage location corresponds to a file path or location (e.g., URL) at which the executable node instance state is stored.

At the step of generating 1020, an executable node instance manifest is generated (e.g., the executable node instance manifest 546 shown in FIG. 5). The executable node instance manifest comprises the second unique node identifier associated with the node instance, the third unique node identifier associated with overlay instance, and the storage location for the executable node instance state (e.g., the executable node instance manifest 546 shown in FIG. 5 comprises the second unique node identifier 526, the fourth unique node identifier 562, and the storage location for the executable node instance state 544).

At the step of generating 1022, an executable node instance manifest state for the executable node instance manifest is generated (e.g., the executable node instance manifest state 548 shown in FIG. 5 is generated for the executable node instance manifest 546). The executable node instance manifest state comprises the second unique node identifier (e.g., the second unique node identifier 526 shown in FIG. 5).

At the step of storing 1024, the executable node instance manifest state (e.g., the executable node instance manifest state 548 shown in FIG. 5) is stored.

Optionally, the steps shown in FIG. 10B further comprise the step of storing the executable node instance state (e.g., the executable node instance state 544 shown in FIG. 5) at the storage location for the executable node instance state.

Figure 10C:
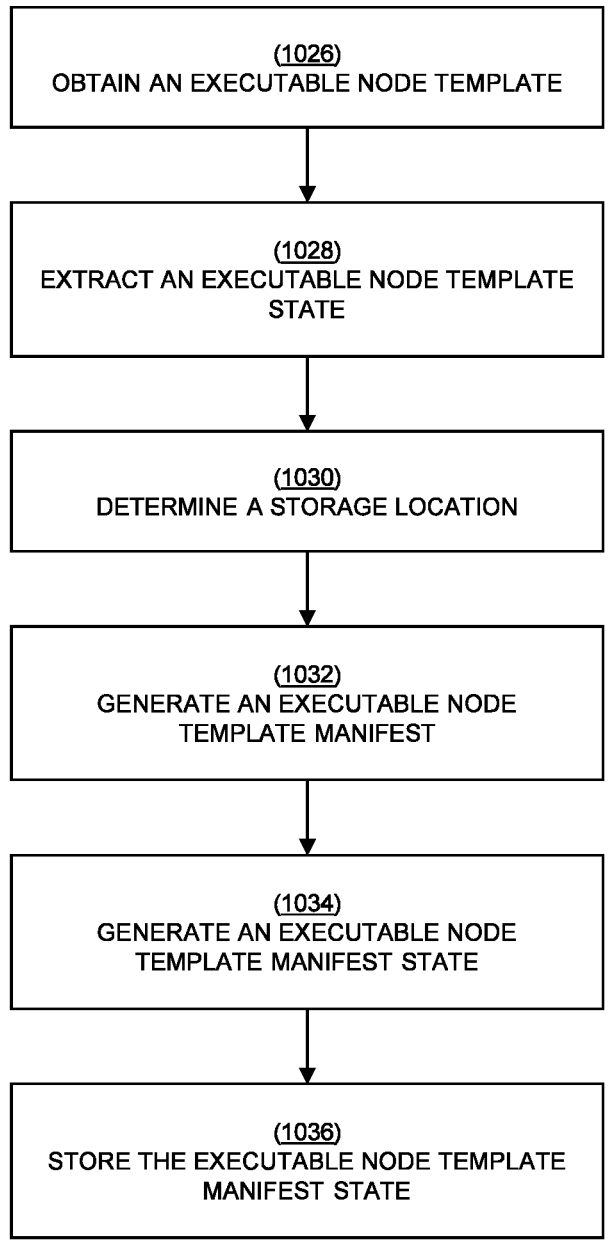
FIG. 10C shows steps which may be performed in conjunction with the method of FIG. 10A to store an executable node template according to an embodiment of the present disclosure.

FIG. 10C shows steps which may be performed in conjunction with the method 1000 to store an executable node template according to an embodiment of the present disclosure.

FIG. 10C shows the steps of obtaining 1026 an executable node template, extracting 1028 an executable node template state, determining 1030 a storage location, generating 1032 an executable node template manifest, generating 1034 an executable node template manifest state, and storing 1036 the executable node template manifest state.

At the step of obtaining 1026, an executable node template is obtained (e.g., the executable node template 534 shown in FIG. 5). The executable node template comprises the node template (e.g., the node template 514 shown in FIG. 5) and an overlay template comprising a fourth unique node identifier (e.g., the overlay template 550 and the third unique node identifier 552 shown in FIG. 5).

At the step of extracting 1028, an executable node template state is extracted from the executable node template (e.g., the executable node template state 536 shown in FIG. 5 is extracted from the executable node template 534).

At the step of determining 1030, a storage location is determined for the executable node template state (e.g., the executable node template state 536 shown in FIG. 5). Here, the storage location corresponds to a file path or location (e.g., URL) at which the executable node template state is stored.

At the step of generating 1032, an executable node template manifest is generated (e.g., the executable node template manifest 538 shown in FIG. 5). The executable node template manifest comprises the first unique node identifier associated with the node template, the fourth unique node identifier, and the storage location for the executable node template state (e.g., the executable node template manifest 538 shown in FIG. 5 comprises the first unique node identifier 516, the third unique node identifier 552, and the storage location for the executable node template state 536).

At the step of generating 1034, an executable node template manifest state for the executable node template manifest is generated (e.g., the executable node template manifest state 540 shown in FIG. 5 is generated for the executable node template manifest 538). The executable node template manifest state comprises the first unique node identifier (e.g., the first unique node identifier 516 shown in FIG. 5).

At the step of storing 1036, the executable node template manifest state (e.g., the executable node template manifest state 540 shown in FIG. 5) is stored.

Optionally, the steps shown in FIG. 10C further comprise the step of storing the executable node template state (e.g., the executable node template state 536 shown in FIG. 5) at the storage location for the executable node template state.

The skilled person will appreciate that the above-described storage management processes described in relation to FIGS. 9A-9D and FIGS. 10A-10C may be used to load and store a run-time overlay comprising an overlay template and an overlay instance (or an element thereof). Because overlay templates and overlay instances are specific types of node templates and node instances (as described above in relation to FIG. 4A) the processes for saving and loading node templates and node instances as described above in relation to FIGS. 9A-9D and FIG. 10 may be used to save and load run-time overlays, overlay templates, and/or overlay instances.

Figure 11:
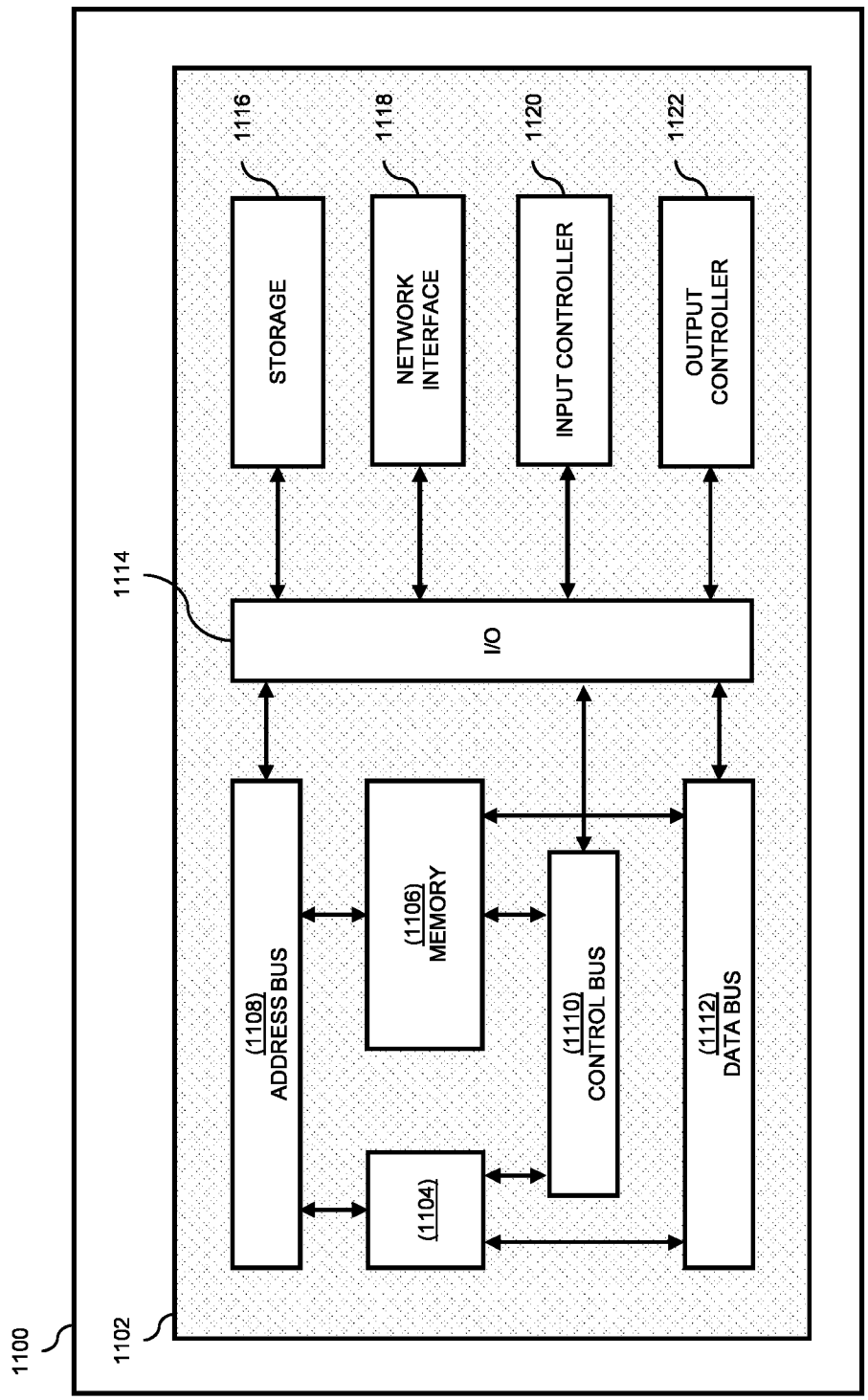
FIG. 11 shows an example computing system for carrying out the methods of the present disclosure.

FIG. 11 shows an example computing system for carrying out the methods of the present disclosure. Specifically, FIG. 11 shows a block diagram of an embodiment of a computing system according to example embodiments of the present disclosure.

Computing system 1100 can be configured to perform any of the operations disclosed herein such as, for example, any of the operations discussed with reference to the functional modules described in relation to FIG. 1A. The computing system 1100 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1100 is a distributed system configured to function using multiple computing machines interconnected via a data network or bus system.

The computing system 1100 includes one or more computing device(s) 1102. The one or more computing device(s) 1102 of computing system 1100 comprise one or more processors 1104 and memory 1106. One or more processors 1104 can be any general-purpose processor(s) configured to execute a set of instructions. For example, one or more processors 1104 can be a processor core, a multiprocessor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/microcontroller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 1104 include one processor. Alternatively, one or more processors 1104 include a plurality of processors that are operatively connected. For example, the one or more processors 1104 can be multiple processing units, a single processing core, multiple processing cores, special purpose processing cores, co-processors, or any combination thereof. One or more processors 1104 are communicatively coupled to memory 1106 via address bus 1108, control bus 1110, and data bus 1112.

Memory 1106 can include non-volatile memories such as read-only memory ("ROM"), programable read-only memory ("PROM"), erasable programmable read-only memory ("EPROM"), flash memory, or any other device capable of storing program instructions or data with or without applied power. The memory 1106 can also include volatile memories, such as random-access memory ("RAM"), static random-access memory ("SRAM"), dynamic random-access memory ("DRAM"), and synchronous dynamic random-access memory ("SDRAM"). The memory 1106 can comprise single or multiple memory modules. While the memory 1106 is depicted as part of the one or more computing device(s) 1102, the skilled person will recognize that the memory 1106 can be separate from the one or more computing device(s) 1102.

Memory 1106 can store information that can be accessed by one or more processors 1104. For instance, memory 1106 (e.g., one or more non-transitory computer-readable storage mediums, memory devices) can include computer-readable instructions (not shown) that can be executed by one or more processors 1104. The computer-readable instructions can be software written in any suitable programming language or can be implemented in hardware. Additionally, or alternatively, the computer-readable instructions can be executed in logically and/or virtually separate threads on one or more processors 1104. For example, memory 1106 can store instructions (not shown) that when executed by one or more processors 1104 cause one or more processors 1104 to perform operations such as any of the operations and functions for which computing system 1100 is configured, as described herein. In addition, or alternatively, memory 1106 can store data (not shown) that can be obtained, received, accessed, written, manipulated, created, and/or stored. The data can include, for instance, the data and/or information described herein in relation to FIGS. 1 to 11. In some implementations, the one or more computing device(s) 1102 can obtain from and/or store data in one or more memory device(s) that are remote from the computing system 1100.

The one or more computing device(s) 1102 further comprise I/O interface 1114 communicatively coupled to address bus 1108, control bus 1110, and data bus 1112. The I/O interface 1114 is configured to couple to one or more external devices (e.g., to receive and send data from/to one or more external devices). Such external devices, along with the various internal devices, may also be known as peripheral devices. The I/O interface 1114 may include both electrical and physical connections for operably coupling the various peripheral devices to the one or more computing device(s) 1102. The I/O interface 1114 may be configured to communicate data, addresses, and control signals between the peripheral devices and the one or more computing device(s) 1102. The I/O interface 1114 may be configured to implement any standard interface, such as a small computer system interface("SCSI"), serial-attached SCSI ("SAS"), fibres channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 1114 is configured to implement only one interface or bus technology. Alternatively, the I/O interface 1114 is configured to implement multiple interfaces or bus technologies. The I/O interface 1114 may include one or more buffers for buffering transmissions between one or more external devices, internal devices, the one or more computing device(s), or the one or more processors 1104. The I/O interface 1114 may couple the one or more computing device(s) 1102 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1114 may couple the one or more computing device(s) 1102 to various output devices, including video displays, speakers, printers, projectors, tactile feedback devices, automation control, robotic components, actuators, motors, fans, solenoids, valves, pumps, transmitters, signal emitters, lights, and so forth.

Computing system 1100 further comprises storage unit 1116, network interface 1118, input controller 1120, and output controller 1122. Storage unit 1116, network interface 1118, input controller 1120, and output controller 1122 are communicatively coupled to the central control unit (i.e., the memory 1106, the address bus 1108, the control bus 1110, and the data bus 1112) via I/O interface 1114. The network interface 1118 communicatively couples the computing system 1100 to one or more networks such as wide area networks ("WAN"), local area networks ("LAN"), intranets, the Internet, wireless access networks, wired networks, mobile networks, telephone networks, optical networks, or combinations thereof. The network interface 1118 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 1116 is a computer readable medium, preferably a non-transitory computer readable medium, comprising one or more programs, the one or more programs comprising instructions which when executed by the one or more processors 1104 cause computing system 1100 to perform the method steps of the present disclosure. Alternatively, storage unit 1116 is a transitory computer readable medium. Storage unit 1116 can include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 1116 stores one or more operating systems, application programs, program modules, data, or any other information. The storage unit 1116 is part of the one or more computing device(s) 1102. Alternatively, the storage unit 1116 is part of one or more other computing machines that are in communication with the one or more computing device(s) 1102, such as servers, database servers, cloud storage, network attached storage, and so forth.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of all examples, or exemplary language ("e.g.," "such as," "including," or the like) provided herein, is intended merely to better illuminate the embodiments, and does not pose a limitation on the scope of the embodiments or the claims.

Moreover, for example, the present technology/system may achieve the following configurations: 1. A method for template-driven generation of run-time executable graph-based models, the method comprising: obtaining, by processing circuitry, a node template comprising a predetermined node structure and one or more rules governing generation of node instances based on the node template; receiving, by the processing circuitry, one or more data elements; in response to the one or more data elements being received, generating, by the processing circuitry, a first run-time node comprising the node template and a first node instance, wherein the first node instance comprises the one or more data elements mapped to the node template based on the one or more rules of the node template; obtaining, by the processing circuitry, a first run-time overlay comprising an overlay template and a first overlay instance comprising processing logic implementing at least one generic rule of the overlay template; and generating, by the processing circuitry, a first executable run-time node comprising a composition of the first run-time node and the first run-time overlay such that the processing logic of the first run-time overlay is operable to interact with the first run-time node during execution of the first executable run-time node. 2. The method of 1 further comprising, prior to the step of receiving the one or more data elements: receiving, by the processing circuitry, a first stimulus and a first context associated with the first stimulus, wherein the step of receiving the one or more data elements occurs in response to the first stimulus being received. 3. The method of 2 wherein the step of receiving the one or more data elements is based on the first context. 4. The method of 1 further comprising, after the step of generating the first executable run-time node: receiving, by the processing circuitry, a second stimulus and a second context associated with the second stimulus; and in response to the second stimulus being received, causing, by the processing circuitry, an execution of the processing logic of the first run-time overlay of the first executable run-time node. 5. The method of 4 wherein the execution of the processing logic is based on the second context. 6. The method of 4 further comprising, after the step of causing execution: obtaining, by the processing circuitry, one or more outcomes of the execution; and outputting, by the processing circuitry, the one or more outcomes of the execution. 7. The method of 1 further comprising: obtaining, by the processing circuitry, a second run-time node comprising the node template and a second node instance generated based on the one or more rules of the node template; and generating, by the processing circuitry, a second executable run-time node comprising a composition of the second node instance and the first run-time overlay such that the processing logic of the first run-time overlay is operable to interact with the second run-time node during execution of the second executable run-time node. 8. The method of 1 wherein the step of obtaining the first run-time overlay comprises: obtaining, by the processing circuitry, the overlay template and the first overlay instance; and associating, by the processing circuitry, the overlay template and the first overlay instance thereby generating the first run-time overlay. 9. The method of 1 wherein the step of generating the first run-time node comprises: generating, by the processing circuitry, the first node instance by mapping the one or more data elements to the node template based on the one or more rules of the node template. 10. The method of 1 wherein the overlay template is shared by the first run-time overlay and a second run-time overlay. 11. The method of 1 wherein the first run-time overlay is associated with the node template such that the node template is an executable node template. 12. The method of 1 wherein the overlay template of the first run-time overlay is associated with the node template and the first overlay instance of the first run-time overlay is associated with the first node instance. 13. The method of 1 wherein access to the overlay template of the first run-time overlay is restricted to read only access. 14. The method of 1 wherein access to the node template is restricted to read only access. 15. The method of 1 wherein the node template comprises an attribute template comprising a name and a value type for a corresponding attribute. 16. The method of 15 wherein the node template defines a default value for the attribute template. 17. The method of 15 wherein the first node instance comprises an instance value for the attribute template. 18. The method of 17 wherein the instance value of the node instance is assigned based on at least one of the one or more data elements. 19. A non-transitory computer readable medium storing instruction which, when executed by processing circuitry, cause the processing circuitry to carry out the steps of 1. 20. A device comprising processing circuitry and memory storing instructions which, when executed by the processing circuitry, cause the processing circuitry to carry out the steps of 1. 21. A method for loading run-time nodes of a template-based executable graph-based model, the method comprising: obtaining, by processing circuitry, a node instance manifest state based on a first unique node identifier associated with a node instance, wherein the node instance manifest state comprises a second unique node identifier associated with a node template; generating, by the processing circuitry, a node instance manifest from the node instance manifest state, wherein the node instance manifest comprises a first storage location and the first unique node identifier; obtaining, by the processing circuitry, a node instance state from the first storage location; obtaining, by the processing circuitry, the node template based on the second unique node identifier associated with the node template; generating, by the processing circuitry, the node instance from the node instance manifest, the node instance state, and the node template; and generating, by the processing circuitry, a run-time node comprising a composition of the node instance and the node template. 22. The method of 21 wherein the step of obtaining the node template comprises: obtaining, by the processing circuitry, a node template manifest state based on the second unique node identifier associated with the node template; generating, by the processing circuitry, a node template manifest from the node template manifest state, wherein the node template manifest comprises a second storage location and the second unique node identifier; obtaining, by the processing circuitry, a node template state from the second storage location; and generating, by the processing circuitry, the node template from the node template manifest and the node template state. 23. The method of 21 further comprising: obtaining, by the processing circuitry, an executable node instance manifest state based on the first unique node identifier associated with the node instance, wherein the executable node instance manifest state comprises the first unique node identifier and a third unique node identifier associated with a first overlay instance; generating, by the processing circuitry, an executable node instance manifest from the executable node instance manifest state, wherein the executable node instance manifest comprises a third storage location and the first unique node identifier; obtaining, by the processing circuitry, an executable node instance state from the third storage location; obtaining, by the processing circuitry, a first run-time overlay based on the third unique node identifier, wherein the first run-time overlay comprises the third unique node identifier, the first overlay instance, and a first overlay template associated with the first overlay instance; and generating, by the processing circuitry, an executable node instance based on the node instance, the executable node instance manifest, the executable node instance state, and the first run-time overlay, wherein the run-time node is generated using the executable node instance such that the composition of the run-time node comprises the executable node instance and the node template. 24. The method of 21 further comprising: obtaining, by the processing circuitry, an executable node template manifest state based on the second unique node identifier associated with the node template, wherein the executable node template manifest state comprises the second unique node identifier and a third unique node identifier associated with a second overlay template; generating, by the processing circuitry, an executable node template manifest from the executable node template manifest state, wherein the executable node template manifest comprises a fourth storage location and the second unique node identifier; obtaining, by the processing circuitry, an executable node template state from the fourth storage location; obtaining, by the processing circuitry, the second overlay template based on the third unique node identifier; and associating, by the processing circuitry, the node template and the second overlay template. 25. The method of 24 further comprising: obtaining, by the processing circuitry, a second overlay instance based on a fourth unique node identifier, wherein the executable node template manifest comprises the fourth unique node identifier; generating, by the processing circuitry, a second run-time overlay comprising a composition of the second overlay template and the second overlay instance; and generating, by the processing circuitry, an executable node template based on the node template, the executable node template manifest, the executable node template state, and the second run-time overlay, wherein the run-time node is generated using the executable node template such that the composition of the run-time node comprises the node instance and the executable node template. 26. A non-transitory computer readable medium storing instruction which, when executed by processing circuitry, cause the processing circuitry to carry out the steps of 21. 27. A device comprising processing circuitry and memory storing instructions which, when executed by the processing circuitry, cause the processing circuitry to carry out the steps of 21. 28. A method for storage management of run-time nodes of a template-based executable graph-based model, the method comprising: obtaining, by processing circuitry, a run-time node comprising a node template and a node instance generated according to the node template, wherein the node template is associated with a first unique node identifier and the node instance is associated with a second unique node identifier; extracting, by the processing circuitry, a node instance state from the node instance, wherein the node instance state comprises the first unique node identifier and the second unique node identifier; determining, by the processing circuitry, a storage location for the node instance state; generating, by the processing circuitry, a node instance manifest associated with the node instance, wherein the node instance manifest comprises the first unique node identifier, the second unique node identifier, and the storage location for the node instance state; generating, by the processing circuitry, a node instance manifest state for the node instance manifest, wherein the node instance manifest state comprises the first unique node identifier and the second unique node identifier; and storing, by the processing circuitry, the node instance manifest state. 29. The method of 28 wherein the node instance manifest state is stored at a first device and a node template manifest state associated with the node template is stored at a second device, the second device being different to the first device. 30. The method of 28 further comprising: storing, by the processing circuitry, the node instance state at the storage location. 31. The method of 28 further comprising: obtaining, by the processing circuitry, an executable node instance comprising the node instance and a first run-time overlay having an overlay instance comprising a third unique node identifier; extracting, by the processing circuitry, an executable node instance state from the executable node instance, determining, by the processing circuitry, a storage location for the executable node instance state; generating, by the processing circuitry, an executable node instance manifest comprising the second unique node identifier associated with the node instance, the third unique node identifier, and the storage location for the executable node instance state; generating, by the processing circuitry, an executable node instance manifest state for the executable node instance manifest, wherein the executable node instance manifest state comprises the second unique node identifier; and storing, by the processing circuitry, the executable node instance manifest state. 32 The method of 31 further comprising: storing, by the processing circuitry, the executable node instance state at the storage location for the executable node instance state. 33. The method of 28 further comprising: obtaining, by the processing circuitry, an executable node template comprising the node template and an overlay template comprising a fourth unique node identifier; extracting, by the processing circuitry, an executable node template state from the executable node template, determining, by the processing circuitry, a storage location for the executable node template state; generating, by the processing circuitry, an executable node template manifest comprising the first unique node identifier associated with the node template, the fourth unique node identifier, and the storage location for the executable node template state; generating, by the processing circuitry, an executable node template manifest state for the executable node template manifest, wherein the executable node template manifest state comprises the first unique node identifier; and storing, by the processing circuitry, the executable node template manifest state. 34. The method of 33 further comprising: storing, by the processing circuitry, the executable node template state at the storage location for the executable node template state. 35. The method of 33 wherein the executable node template manifest further comprises a fifth unique node identifier associated with an overlay instance generated from the overlay template. 36. A non-transitory computer readable medium storing instruction which, when executed by processing circuitry, cause the processing circuitry to carry out the steps of 28. 37. A device comprising processing circuitry and memory storing instructions which, when executed by the processing circuitry, cause the processing circuitry to carry out the steps of 28.

What is claimed is:

1. A method for template-driven generation of run-time executable graph-based models, the method comprising:
    obtaining, by processing circuitry, a node template comprising a predetermined node structure and one or more rules governing generation of node instances based on the node template;
    receiving, by the processing circuitry, one or more data elements;
    in response to the one or more data elements being received, generating, by the processing circuitry, a first run-time node comprising the node template and a first node instance, wherein the first node instance comprises the one or more data elements mapped to the node template based on the one or more rules of the node template;
    obtaining, by the processing circuitry, a first run-time overlay comprising an overlay template and a first overlay instance comprising processing logic implementing at least one generic rule of the overlay template; and
    generating, by the processing circuitry, a first executable run-time node comprising a composition of the first run-time node and the first run-time overlay such that the processing logic of the first run-time overlay is operable to interact with the first run-time node during execution of the first executable run-time node.

2. The method of claim 1 further comprising, prior to the reception of the one or more data elements:
    receiving, by the processing circuitry, a first stimulus and a first context associated with the first stimulus, wherein the reception of the one or more data elements occurs in response to the first stimulus being received.

3. The method of claim 2 wherein the reception of the one or more data elements is based on the first context.

4. The method of claim 1 further comprising, after the generation of the first executable run-time node:
receiving, by the processing circuitry, a second stimulus and a second context associated with the second stimulus; and
in response to the second stimulus being received, causing, by the processing circuitry, an execution of the processing logic of the first run-time overlay of the first executable run-time node.

5. The method of claim 4 wherein the execution of the processing logic of the first run-time overlay of the first executable run-time node is based on the second context.

6. The method of claim 4 further comprising, after the execution of the processing logic of the first run-time overlay of the first executable run-time node:
obtaining, by the processing circuitry, one or more outcomes of the execution of the processing logic of the first run-time overlay; and
outputting, by the processing circuitry, the one or more outcomes of the execution of the processing logic of the first run-time overlay.

7. The method of claim 1 further comprising:
obtaining, by the processing circuitry, a second run-time node comprising the node template and a second node instance generated based on the one or more rules of the node template; and
generating, by the processing circuitry, a second executable run-time node comprising a composition of the second node instance and the first run-time overlay such that the processing logic of the first run-time overlay is operable to interact with the second run-time node during execution of the second executable run-time node.

8. The method of claim 1 wherein the obtaining of the first run-time overlay comprises:
obtaining, by the processing circuitry, the overlay template and the first overlay instance; and
associating, by the processing circuitry, the overlay template and the first overlay instance thereby generating the first run-time overlay.

9. The method of claim 1 wherein the generation of the first run-time node comprises:
generating, by the processing circuitry, the first node instance by mapping the one or more data elements to the node template based on the one or more rules of the node template.

10. The method of claim 1 wherein the overlay template is shared by the first run-time overlay and a second run-time overlay.

11. The method of claim 1 wherein the first run-time overlay is associated with the node template such that the node template is an executable node template.

12. The method of claim 1 wherein the overlay template of the first run-time overlay is associated with the node template and the first overlay instance of the first run-time overlay is associated with the first node instance.

13. The method of claim 1 wherein the node template comprises an attribute template comprising a name and a value type for a corresponding attribute.

14. The method of claim 13 wherein the node template defines a default value for the attribute template.

15. The method of claim 13 wherein the first node instance comprises an instance value for the attribute template.

16. The method of claim 15 wherein the instance value of the node instance is assigned based on at least one of the one or more data elements.

17. A non-transitory computer readable medium having stored thereon instructions for template-driven generation of run-time executable graph-based models, wherein the instructions when executed by processing circuitry, cause the processing circuitry to:
obtain a node template comprising a predetermined node structure and one or more rules governing generation of node instances based on the node template;
receive one or more data elements;
in response to the one or more data elements being received, generate a first run-time node comprising the node template and a first node instance, wherein the first node instance comprises the one or more data elements mapped to the node template based on the one or more rules of the node template;
obtain a first run-time overlay comprising an overlay template and a first overlay instance comprising processing logic implementing at least one generic rule of the overlay template; and
generate a first executable run-time node comprising a composition of the first run-time node and the first run-time overlay such that the processing logic of the first run-time overlay is operable to interact with the first run-time node during execution of the first executable run-time node.

18. A device comprising processing circuitry and memory storing instructions which, when executed by the processing circuitry, cause the processing circuitry to:
obtain a node template comprising a predetermined node structure and one or more rules governing generation of node instances based on the node template;
receive one or more data elements;
in response to the one or more data elements being received, generate a first run-time node comprising the node template and a first node instance, wherein the first node instance comprises the one or more data elements mapped to the node template based on the one or more rules of the node template;
obtain a first run-time overlay comprising an overlay template and a first overlay instance comprising processing logic implementing at least one generic rule of the overlay template; and
generate a first executable run-time node comprising a composition of the first run-time node and the first run-time overlay such that the processing logic of the first run-time overlay is operable to interact with the first run-time node during execution of the first executable run-time node.

* * * * *